(12) United States Patent
Liang et al.

(10) Patent No.: US 11,059,740 B2
(45) Date of Patent: Jul. 13, 2021

(54) GLASS ARTICLE CONTAINING A COATING WITH AN INTERPENETRATING POLYMER NETWORK

(71) Applicant: Guardian Glass, LLC, Auburn Hills, MI (US)

(72) Inventors: Liang Liang, Taylor, MI (US); Suresh Devisetti, Canton, MI (US)

(73) Assignee: GUARDIAN GLASS, LLC, Auburn Hills, MI (US)

( * ) Notice: Subject to any disclaimer, the term of this patent is extended or adjusted under 35 U.S.C. 154(b) by 271 days.

(21) Appl. No.: 15/996,606

(22) Filed: Jun. 4, 2018

(65) Prior Publication Data

US 2018/0346375 A1 Dec. 6, 2018

Related U.S. Application Data

(60) Provisional application No. 62/514,162, filed on Jun. 2, 2017.

(51) Int. Cl.
*C03C 17/00* (2006.01)
*C03C 17/30* (2006.01)
*C03C 17/32* (2006.01)

(52) U.S. Cl.
CPC .......... *C03C 17/009* (2013.01); *C03C 17/30* (2013.01); *C03C 17/32* (2013.01); *C03C 17/322* (2013.01); *C03C 17/326* (2013.01); *C03C 2217/29* (2013.01); *C03C 2217/445* (2013.01); *C03C 2218/32* (2013.01)

(58) Field of Classification Search
CPC .................................................. C03C 17/009
See application file for complete search history.

(56) References Cited

U.S. PATENT DOCUMENTS

| | | | |
|---|---|---|---|
| 4,649,062 A | 3/1987 | Kosiorek et al. | |
| 5,269,840 A | 12/1993 | Morris et al. | |
| 5,332,767 A | 7/1994 | Reisser et al. | |
| 6,030,067 A | 2/2000 | Kawamura et al. | |
| 6,147,156 A | 11/2000 | Yamaya et al. | |
| 7,687,585 B2 | 3/2010 | Karthauser et al. | |
| 7,776,389 B2 | 8/2010 | Watanabe et al. | |
| 7,871,949 B2 | 1/2011 | Lee et al. | |
| 8,668,798 B2 | 3/2014 | Cooper et al. | |
| 8,721,931 B2 | 5/2014 | Konno | |
| 8,816,012 B2 | 8/2014 | Brown et al. | |
| 8,978,416 B2 | 3/2015 | Kuwahara et al. | |
| 9,150,750 B2 | 10/2015 | Brown et al. | |
| 2002/0142150 A1 | 10/2002 | Baumann et al. | |
| 2003/0152780 A1 | 8/2003 | Baumann et al. | |
| 2004/0105985 A1 | 6/2004 | Henze et al. | |
| 2004/0214980 A1 | 10/2004 | Pourreau et al. | |
| 2006/0029799 A1 | 2/2006 | Sebastian et al. | |
| 2006/0154091 A1 | 7/2006 | Schmidt et al. | |
| 2007/0195419 A1 | 8/2007 | Tsuda et al. | |
| 2008/0118864 A1* | 5/2008 | Sasaki | G03F 7/0047 430/270.1 |
| 2008/0158663 A1 | 7/2008 | Hsu et al. | |
| 2009/0087646 A1 | 4/2009 | Sirejacob et al. | |
| 2010/0028643 A1 | 2/2010 | Zhu | |
| 2011/0228400 A1 | 9/2011 | Cretier et al. | |
| 2012/0070626 A1 | 3/2012 | Battis et al. | |
| 2012/0104330 A1* | 5/2012 | Choi | C09D 11/52 252/512 |
| 2012/0295209 A1 | 11/2012 | Pierre et al. | |
| 2013/0115445 A1 | 5/2013 | Devaux et al. | |
| 2014/0072806 A1 | 3/2014 | Allen et al. | |
| 2014/0329256 A1 | 11/2014 | Singbartl et al. | |
| 2015/0064479 A1 | 3/2015 | Ming et al. | |
| 2016/0200630 A1 | 7/2016 | Amano | |
| 2017/0121530 A1 | 5/2017 | Sigmund et al. | |
| 2017/0218894 A1 | 8/2017 | Girondi | |
| 2018/0072615 A1 | 3/2018 | Liang et al. | |

FOREIGN PATENT DOCUMENTS

| | | |
|---|---|---|
| CN | 101314522 B | 9/2010 |
| CN | 102073073 A | 5/2011 |
| CN | 102211435 A | 10/2011 |
| CN | 102375165 A | 3/2012 |
| CN | 101805563 B | 11/2012 |
| DE | 3909656 A1 | 9/1990 |
| GB | 721858 A | 1/1955 |
| TW | 201213240 A | 4/2012 |
| WO | 0249980 A1 | 6/2002 |
| WO | 2007104752 A1 | 9/2007 |
| WO | 2007135192 A1 | 11/2007 |
| WO | 2011051459 A1 | 5/2011 |
| WO | 2013135637 A1 | 9/2013 |
| WO | 2014170251 A1 | 10/2014 |

OTHER PUBLICATIONS

International Search Report and Written Opinion for International Application No. PCT/US2018/035779, dated Sep. 10, 2018, pp. 9.
International Preliminary Report on Patentability for International Application No. PCT/US2018/035779, dated Dec. 12, 2019, pp. 7.
International Search Report and Written Opinion for PCT/US2018/035779 dated Sep. 10, 2018, 9 pages.

* cited by examiner

*Primary Examiner* — Ian A Rummel

(57) ABSTRACT

A glass article comprising a glass substrate and a coating on a surface of the glass substrate is disclosed. The coating comprises a glass frit and a binder comprising an interpenetrating polymer network. The interpenetrating polymer network comprises a crosslinked polyol resin, a second crosslinked resin, and a third resin. A method of forming the glass article containing the coating is also disclosed.

22 Claims, No Drawings

GLASS ARTICLE CONTAINING A COATING WITH AN INTERPENETRATING POLYMER NETWORK

CROSS-REFERENCE TO RELATED APPLICATION

The present application claims filing benefit of U.S. Provisional Patent Application Ser. No. 62/514,162 having a filing date of Jun. 2, 2017, and which is incorporated herein by reference in its entirety.

BACKGROUND OF THE INVENTION

Glass articles have many applications, including use in buildings and furniture. In general, such glass is formed by applying a coating formulation containing a binder and glass frit to the surface of a glass substrate and then thermally treating the substrate to remove the carrier or solvent. Such treatment provides a coating of the binder and the glass frit on the surface of the glass. Further thermal treatment can be employed to remove the binder and sinter the frit in order to form a final coating. As additional applications are identified, the properties of the glass articles need to be tailored for such applications. As such, a need continues to exist for improved glass articles containing coatings with improved corrosion properties, mechanical properties, and/or adhesive properties.

SUMMARY OF THE INVENTION

In accordance with one embodiment of the present invention, a glass article is disclosed. The glass article comprises a glass substrate and a coating provided on a surface of the glass substrate. The coating comprises a glass frit and a binder comprising an interpenetrating network. The interpenetrating network comprises a crosslinked polyol resin, a second crosslinked resin, and a third resin.

In accordance with another embodiment of the present invention, a method for forming a glass article is disclosed. The method comprises applying a coating formulation to a surface of a glass substrate, wherein the coating formulation comprises a glass frit, a polymerizable polyol, a crosslinking agent, a second polymerizable compound, and a third polymerizable compound. The method further comprises a step of curing the coating formulation on the glass substrate.

Other features and aspects of the present invention are set forth in greater detail below.

DETAILED DESCRIPTION OF REPRESENTATIVE EMBODIMENTS

Definitions

It is to be understood that the terminology used herein is for the purpose of describing particular embodiments only and is not intended to limit the scope of the present invention.

"Alkyl" refers to a monovalent saturated aliphatic hydrocarbyl group, such as those having from 1 to 25 carbon atoms and, in some embodiments, from 1 to 12 carbon atoms. "$C_{x-y}$alkyl" refers to alkyl groups having from x to y carbon atoms. This term includes, by way of example, linear and branched hydrocarbyl groups such as methyl ($CH_3$), ethyl ($CH_3CH_2$), n-propyl ($CH_3CH_2CH_2$), isopropyl (($CH_3)_2CH$), n-butyl ($CH_3CH_2CH_2CH_2$), isobutyl (($CH_3)_2CHCH_2$), sec-butyl (($CH_3)(CH_3CH_2)CH$), t-butyl (($CH_3)_3C$), n-pentyl ($CH_3CH_2CH_2CH_2CH_2$), neopentyl (($CH_3)_3CCH_2$), hexyl ($CH_3(CH_2CH_2CH_2)_5$), etc.

"Alkenyl" refers to a linear or branched hydrocarbyl group, such as those having from 2 to 10 carbon atoms, and in some embodiments from 2 to 6 carbon atoms or 2 to 4 carbon atoms, and having at least 1 site of vinyl unsaturation ($>C=C<$). For example, ($C_x$-$C_y$)alkenyl refers to alkenyl groups having from x to y carbon atoms and is meant to include for example, ethenyl, propenyl, 1,3-butadienyl, and so forth.

"Aryl" refers to an aromatic group, which may have from 3 to 14 carbon atoms and no ring heteroatoms and having a single ring (e.g., phenyl) or multiple condensed (fused) rings (e.g., naphthyl or anthryl). For multiple ring systems, including fused, bridged, and spiro ring systems having aromatic and non-aromatic rings that have no ring heteroatoms, the term "Aryl" applies when the point of attachment is at an aromatic carbon atom (e.g., 5,6,7,8 tetrahydronaphthalene-2-yl is an aryl group as its point of attachment is at the 2-position of the aromatic phenyl ring).

"Cycloalkyl" refers to a saturated or partially saturated cyclic group, which may have from 3 to 14 carbon atoms and no ring heteroatoms and having a single ring or multiple rings including fused, bridged, and spiro ring systems. For multiple ring systems having aromatic and non-aromatic rings that have no ring heteroatoms, the term "cycloalkyl" applies when the point of attachment is at a non-aromatic carbon atom (e.g., 5,6,7,8,-tetrahydronaphthalene-5-yl). The term "cycloalkyl" includes cycloalkenyl groups, such as adamantyl, cyclopropyl, cyclobutyl, cyclopentyl, cyclooctyl, and cyclohexenyl. The term "cycloalkenyl" is sometimes employed to refer to a partially saturated cycloalkyl ring having at least one site of $>C=C<$ring unsaturation.

"Halo" or "halogen" refers to fluoro, chloro, bromo, and iodo.

"Haloalkyl" refers to substitution of an alkyl group with 1 to 5, or in some embodiments, from 1 to 3 halo groups.

"Heteroaryl" refers to an aromatic group, which may have from 1 to 14 carbon atoms and 1 to 6 heteroatoms selected from oxygen, nitrogen, and sulfur and includes single ring (e.g., imidazolyl) and multiple ring systems (e.g., benzimidazol-2-yl and benzimidazol-6-yl). For multiple ring systems, including fused, bridged, and spiro ring systems having aromatic and non-aromatic rings, the term "heteroaryl" applies if there is at least one ring heteroatom and the point of attachment is at an atom of an aromatic ring (e.g., 1,2,3,4-tetrahydroquinolin-6-yl and 5,6,7,8-tetrahydroquinolin-3-yl). In some embodiments, the nitrogen and/or the sulfur ring atom(s) of the heteroaryl group are optionally oxidized to provide for the N oxide (N→O), sulfinyl, or sulfonyl moieties. Examples of heteroaryl groups include, but are not limited to, pyridyl, furanyl, thienyl, thiazolyl, isothiazolyl, triazolyl, imidazolyl, imidazolinyl, isoxazolyl, pyrrolyl, pyrazolyl, pyridazinyl, pyrimidinyl, purinyl, phthalazyl, naphthylpryidyl, benzofuranyl, tetrahydrobenzofuranyl, isobenzofuranyl, benzothiazolyl, benzoisothiazolyl, benzotriazolyl, indolyl, isoindolyl, indolizinyl, dihydroindolyl, indazolyl, indolinyl, benzoxazolyl, quinolyl, isoquinolyl, quinolizyl, quianazolyl, quinoxalyl, tetrahydroquinolinyl, isoquinolyl, quinazolinonyl, benzimidazolyl, benzisoxazolyl, benzothienyl, benzopyridazinyl, pteridinyl, carbazolyl, carbolinyl, phenanthridinyl, acridinyl, phenanthrolinyl, phenazinyl, phenoxazinyl, phenothiazinyl, and phthalimidyl.

"Heterocyclic" or "heterocycle" or "heterocycloalkyl" or "heterocyclyl" refers to a saturated or partially saturated cyclic group, which may have from 1 to 14 carbon atoms and from 1 to 6 heteroatoms selected from nitrogen, sulfur, or oxygen and includes single ring and multiple ring systems including fused, bridged, and spiro ring systems. For multiple ring systems having aromatic and/or non-aromatic rings, the terms "heterocyclic", "heterocycle", "heterocloalkyl", or "heterocyclyl" apply when there is at least one ring heteroatom and the point of attachment is at an atom of a non-aromatic ring (e.g., decahydroquinolin-6-yl). In some embodiments, the nitrogen and/or sulfur atom(s) of the heterocyclic group are optionally oxidized to provide for the N oxide, sulfinyl, sulfonyl moieties. Examples of heterocyclyl groups include, but are not limited to, azetidinyl, tetrahydropyranyl, piperidinyl, N-methylpiperidin-3-yl, piperazinyl, N-methylpyrrolidin-3-yl, 3-pyrrolidinyl, 2-pyrrolidon-1-yl, morpholinyl, thiomorpholinyl, imidazolidinyl, and pyrrolidinyl.

It should be understood that the aforementioned definitions encompass unsubstituted groups, as well as groups substituted with one or more other groups as is known in the art. For example, an alkyl, alkenyl, alkynyl, aryl, heteroaryl, cycloalkyl, or heterocyclyl group may be substituted with from 1 to 8, in some embodiments from 1 to 5, in some embodiments from 1 to 3, and in some embodiments, from 1 to 2 substituents selected from alkyl, alkenyl, alkynyl, alkoxy, acyl, acylamino, acyloxy, amino, quaternary amino, amide, imino, amidino, aminocarbonylamino, amidinocarbonylamino, aminothiocarbonyl, aminocarbonylamino, aminothiocarbonylamino, aminocarbonyloxy, aminosulfonyl, aminosulfonyloxy, aminosulfonylamino, aryl, aryloxy, arylthio, azido, carboxyl, carboxyl ester, (carboxyl ester) amino, (carboxyl ester)oxy, cyano, cycloalkyl, cycloalkyloxy, cycloalkylthio, epoxy, guanidino, halo, haloalkyl, haloalkoxy, hydroxy, hydroxyamino, alkoxyamino, hydrazino, heteroaryl, heteroaryloxy, heteroarylthio, heterocyclyl, heterocyclyloxy, heterocyclylthio, nitro, oxo, oxy, thione, phosphate, phosphonate, phosphinate, phosphonamidate, phosphorodiamidate, phosphoramidate monoester, cyclic phosphoramidate, cyclic phosphorodiamidate, phosphoramidate diester, sulfate, sulfonate, sulfonyl, substituted sulfonyl, sulfonyloxy, thioacyl, thiocyanate, thiol, alkylthio, etc., as well as combinations of such substituents.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to a glass article that contains a glass substrate and a coating provided on a surface of the substrate. The coating includes a glass frit and a binder. The binder includes an interpenetrating network containing a first crosslinked resin, a second crosslinked resin, and a third resin. By selectively controlling the particular nature of the binder and coating, the present inventors have discovered that the resulting glass article and coating may exhibit a variety of beneficial properties. In particular, the glass article and coating may exhibit improved mechanical and adhesive strength as well as improved chemical resistance.

For example, the coating may have a cross-hatch adhesion as determined in accordance with ASTM D3359-09 of 3B or higher, such as 4B or higher, such as 5B. The cross-hatch adhesion provides an assessment of the adhesion of the coating to the substrate by applying and removing pressure-sensitive tape over cutes made in the coating. In addition, the coating may have a methyl-ethyl-ketone (MEK) rub resistance as determined in accordance with ASTM D4752 of about 100 strokes or more, such as about 200 strokes or more, such as about 300 strokes or more, such as about 500 strokes or more, such as about 750 strokes or more. The coating may have a Hoffman hardness of about 10 or greater, such as about 11 or greater, such as about 12 or greater, such as about 15 or greater to about 20 or less, such as about 19 or less, such as about 18 or less, such as about 15 or less as determined using a Hoffman hardness tester in accordance with GE E50TF61. The coating may have a stud pull strength of about 400 pounds per square inch or greater, such as about 450 pounds per square inch or greater, such as about 500 pounds per square inch or greater, such as about 600 pounds per square inch or greater, such as about 800 pounds per square inch or greater to about 2,000 pounds per square inch or less, such as about 1,500 pounds per square inch or less, such as about 1,400 pounds per square inch or less, such as about 1,300 pounds per square inch or less, such as about 1,000 pounds per square inch or less. In addition, the jetness may be 200 or more, such as 225 or more, such as 235 or more, such as 240 or more, such as 245 or more, such as 250 or more, such as 260 or more to 350 or less, such as 300 or less, such as 290 or less, such as 280 or less, such as 270 or less, such as 260 or less.

After being exposed to a copper-accelerated acetic acid-salt spray ("CASS") in accordance with ASTM B368-09 (2014), the coating may exhibit minimal color change. The color change can be characterized by the $\Delta E$ value, which is known in the art and described in more detail below. More particularly, the $\Delta E$ value of the coating may be about 2 or less, such as about 1.5 or less, such as about 1 or less, such as about 0.5 or less to about 0.01 or more, such as about 0.1 or more. In addition, the coating may exhibit a cross-hatch adhesion as determined in accordance with ASTM D3359-09 of 3B or higher, such as 4B or higher, such as 5B. In addition, the coating may have a Hoffman hardness of about 10 or greater, such as about 11 or greater, such as about 12 or greater, such as about 15 or greater to about 20 or less, such as about 19 or less, such as about 18 or less, such as about 15 or less as determined using a Hoffman hardness tester in accordance with GE E50TF61.

After undergoing a condenser chamber test, the coating may exhibit minimal changes in adhesion strength and mechanical strength. For this test, a glass article with a coating is placed in a chamber at 45° C. at 100% humidity for 21 days. The coating may exhibit a cross-hatch adhesion as determined in accordance with ASTM D3359-09 of 3B or higher, such as 4B or higher, such as 5B. In addition, the coating may have a Hoffman hardness of about 10 or greater, such as about 11 or greater, such as about 12 or greater, such as about 15 or greater to about 20 or less, such as about 19 or less, such as about 18 or less, such as about 15 or less as determined using a Hoffman hardness tester in accordance with GE E50TF61. Also, the coating may exhibit minimal color change. For instance, the $\Delta E$ value of the coating may be about 2 or less, such as about 1.5 or less, such as about 1 or less, such as about 0.5 or less to about 0.01 or more, such as about 0.1 or more.

Various embodiments of the present invention will now be described in more detail.

I. Glass Substrate

The glass substrate typically has a thickness of from about 0.1 to about 15 millimeters, in some embodiments from about 0.5 to about 10 millimeters, and in some embodiments, from about 1 to about 8 millimeters. The glass substrate may be formed by any suitable process, such as by a float process, fusion, down-draw, roll-out, etc. Regardless, the substrate is formed from a glass composition having a glass transition temperature that is typically from about 500° C. to about 700° C. The composition, for instance, may contain silica ($SiO_2$), one or more alkaline earth metal oxides (e.g., magnesium oxide (MgO), calcium oxide (CaO), barium oxide (BaO), and strontium oxide (SrO)), and one or more alkali metal oxides (e.g., sodium oxide ($Na_2O$), lithium oxide ($Li_2O$), and potassium oxide ($K_2O$)).

$SiO_2$ typically constitutes from about 55 mol. % to about 85 mol. %, in some embodiments from about 60 mol. % to about 80 mol. %, and in some embodiments, from about 65 mol. % to about 75 mol. % of the composition. Alkaline earth metal oxides may likewise constitute from about 5 mol. % to about 25 mol. %, in some embodiments from about 10 mol. % to about 20 mol. %, and in some embodiments, from about 12 mol. % to about 18 mol. % of the composition. In particular embodiments, MgO may constitute from about 0.5 mol. % to about 10 mol. %, in some embodiments from about 1 mol. % to about 8 mol. %, and in some embodiments, from about 3 mol. % to about 6 mol. % of the composition, while CaO may constitute from about 1 mol. % to about 18 mol. %, in some embodiments from about 2 mol. % to about 15 mol. %, and in some embodiments, from about 6 mol. % to about 14 mol. % of the composition. Alkali metal oxides may constitute from about 5 mol. % to about 25 mol. %, in some embodiments from about 10 mol. % to about 20 mol. %, and in some embodiments, from about 12 mol. % to about 18 mol. % of the composition. In particular embodiments, $Na_2O$ may constitute from about 1 mol. % to about 20 mol. %, in some embodiments from about 5 mol. % to about 18 mol. %, and in some embodiments, from about 8 mol. % to about 15 mol. % of the composition.

Of course, other components may also be incorporated into the glass composition as is known to those skilled in the art. For instance, in certain embodiments, the composition may contain aluminum oxide ($Al_2O_3$). Typically, $Al_2O_3$ is employed in an amount such that the sum of the weight percentage of $SiO_2$ and $Al_2O_3$ does not exceed 85 mol. %. For example, $Al_2O_3$ may be employed in an amount from about 0.01 mol. % to about 3 mol. %, in some embodiments from about 0.02 mol. % to about 2.5 mol. %, and in some embodiments, from about 0.05 mol. % to about 2 mol. % of the composition. In other embodiments, the composition may also contain iron oxide ($Fe_2O_3$), such as in an amount from about 0.001 mol. % to about 8 mol. %, in some embodiments from about 0.005 mol. % to about 7 mol. %, and in some embodiments, from about 0.01 mol. % to about 6 mol. % of the composition. Still other suitable components that may be included in the composition may include, for instance, titanium dioxide ($TiO_2$), chromium (III) oxide ($Cr_2O_3$), zirconium dioxide ($ZrO_2$), ytrria ($Y_2O_3$), cesium dioxide ($CeO_2$), manganese dioxide ($MnO_2$), cobalt (II, III) oxide ($Co_3O_4$), metals (e.g., Ni, Cr, V, Se, Au, Ag, Cd, etc.), and so forth.

II. Coating

As indicated above, a coating is provided on one or more surfaces of the substrate. For example, the glass substrate may contain first and second opposing surfaces, and the coating may thus be provided on the first surface of the substrate, the second surface of the substrate, or both. In one embodiment, for instance, the coating is provided on only the first surface. In such embodiments, the opposing second surface may be free of a coating or it may contain a different type of coating. Of course, in other embodiments, the coating of the present invention may be present on both the first and second surfaces of the glass substrate. In such embodiments, the nature of the coating on each surface may be the same or different.

Additionally, the coating may be employed such that it substantially covers (e.g., 95% or more, such as 99% or more) the surface area of a surface of the glass substrate. However, it should be understood that the coating may also be applied to cover less than 95% of the surface area of a surface of the glass substrate. For instance, the coating may be applied on the glass substrate in a decorative manner.

The coating may contain any number of different materials. For example, the coating contains a binder and a glass frit. The coating may also include, for instance, colorants, light stabilizers, metal alkoxides, nanoparticles, as well as various other types of additives.

A. Binder

As indicated herein, the coating contains a binder. The binder comprises an interpenetrating network comprising at least three resins. It should be understood that the chemical composition of the resins is different from one another.

The interpenetrating network can be a fully-interpenetrating network or a semi-interpenetrating network. In one embodiment, the interpenetrating network is a fully-interpenetrating network such that the network contains three crosslinked resins. That is, all of the resins of the binder are crosslinked to form the interpenetrating network. In this regard, the polymer chains of at least one respective resin are interlocked with the polymer chains of another respective resin such that they may not be separated without breaking any chemical bonds.

The interpenetrating network can also be a semi-interpenetrating network. In such instance, the network contains at least two crosslinked resins. That is, two of the resins of the binder are crosslinked to form the interpenetrating network. In this regard, the polymer chains of at least one respective resin are interlocked with the polymer chains of another respective resin such that they may not be separated without breaking any chemical bonds. Meanwhile, the polymer chains of the third resin may not be interlocked among the polymer chains of the first crosslinked resin and the second crosslinked resin.

In addition, the interpenetrating network may include a combination of an organic crosslinked network and an inorganic crosslinked network. For instance, at least one of the crosslinked resins may form an organic crosslinked network while at least one of the crosslinked resins may form an inorganic crosslinked resin. By organic crosslinked resin, it is meant that the polymerizable compound is a carbon-based compound. Meanwhile, by inorganic crosslinked resin, it is meant that the polymerizable compound is not a carbon-based compound. For instance, the polymerizable compound may be a silicon-based compound. In one embodiment, the interpenetrating network may include at least two organic crosslinked networks and one inorganic crosslinked network.

As described herein, an interpenetrating network can be synthesized using any method known in the art. For instance, a formulation containing all of the polymerizable compounds as well as any other reactants, reagents, and/or additives (e.g., initiators, catalysts, etc.) can be cured such that the simultaneous polymerization and crosslinking of the respective resins forms the interpenetrating network. In this regard, the respective crosslinked resins may form at substantially the same time. It should be understood that the aforementioned polymerizable compounds may include individual monomers and oligomers or pre-polymers.

Alternatively, a first crosslinked resin can be formed and provided in a formulation containing other polymerizable compounds for a second crosslinked resin and/or a third crosslinked resin. In such embodiment, the polymerizable compounds are cured to form a respective network that is interlocked or interlaced with the already formed first crosslinked resin. Even further, a first crosslinked resin and a second crosslinked resin can be formed and provided in a formulation containing other polymerizable compounds for a third crosslinked resin. In such embodiment, the polymerizable compounds are cured to form a respective network that is interlocked or interlaced with the already formed first and second crosslinked resins. In addition, the first crosslinked resin and the second crosslinked resin themselves may form an interpenetrating network or may not form an interpenetrating network until polymerization and crosslinking of the polymerizable compounds of the third crosslinked resin.

An interpenetrating network can also exhibit certain properties that distinguish it from a simple blend of resins. The interpenetrating network may exhibit a glass transition temperature that is between or intermediate the glass transition temperature of any two of the first crosslinked resin, the second crosslinked resin, and the third resin. For instance, the interpenetrating network may have a glass transition temperature of 0° C. or more, such as 10° C. or more, such as 20° C. or more, such as 30° C. or more, such as 40° C. or more to 300° C. or less, such as 250° C. or less, such as 200° C. or less, such as 180° C. or less. For instance, the glass transition temperature may be from 0° C. to 300° C., such as from 10° C. to 250° C., such as from 20° C. to 200° C., such as from 30° C. to 180° C. The glass transition temperature may be measured by differential scanning calorimetry according to ASTM E1356. In addition, for other properties that may exhibit a bimodal distribution or a trimodal distribution due to the presence of a simple mixture of two resins or three resins, respectively, such properties of the interpenetrating network may exhibit a unimodal distribution.

In general, the resins of the binder may be a thermoplastic resin or a thermoset resin. At least one of the resins in the binder is a thermoset resin such that it can be cured/crosslinked. For instance, by curing, the thermoset resin can become hardened and allow for the formation of a coating. The thermoset resin is generally formed from at least one crosslinkable or polymerizable resin, such as a (meth)acrylic resin, (meth)acrylamide resin, alkyd resin, phenolic resin, amino resin, silicone resin, epoxy resin, polyol resin, etc. As used herein, the term "(meth)acrylic" generally encompasses both acrylic and methacrylic resins, as well as salts and esters thereof, e.g., acrylate and methacrylate resins. In one embodiment, at least two of the resins may be thermoset resins. In one embodiment, two of the resins may be thermoset resins while a third resin may be a thermoplastic resin. In another embodiment, at least three of the resins may be thermoset resins.

In this regard, the binder contains a first crosslinked resin. The first crosslinked resin may be a crosslinked polyol resin. The crosslinked polyol resin can be obtained by reacting or crosslinking polyols. In general, polyols contain two or more hydroxyl groups (i.e., defined as an —OH group wherein the —OH group of a carboxyl group is not considered a hydroxyl group). In general, polyols can be non-polymeric polyols or polymeric polyols. Examples of such polyols may include, for instance, a diol compound, a polyether polyol, a polyester polyol, a polycarbonate polyol, a polyacrylate polyol, a polyurethane polyol, a polysiloxane polyol, a phenolic polyol, a sugar alcohol, a dendritic polyol, and so forth. In one embodiment, the polyol may be a diol compound, a polyether polyol, a sugar alcohol, and/or a dendritic polyol. However, it should be understood that the polyol may not be limited to the aforementioned and may include any polyol known in the art that can be polymerized and/or crosslinked.

As indicated above, the polyol may include a diol compound. For instance, the polyol may be an ethylene glycol, diethylene glycol, propylene glycol, dipropylene glycol, butanediol, pentanediol, hexanediol, heptanediol, octanediol, nonanediol, decanediol, etc. While the aforementioned are diol compounds containing two hydroxyl groups, it should be understood that compounds containing additional hydroxyl groups may also be employed.

In one embodiment, the polyol may include a polyether polyol. The polyether polyol may include an ethoxylation or a propoxylation product of water or a diol. The polyether polyol may be polyethylene glycol, polypropylene glycol, or a combination thereof. In one embodiment, the polyether polyol may be polyethylene glycol. In another embodiment, the polyether polyol may be polypropylene glycol. For instance, the propylene glycol may be a monopropylene glycol, dipropylene glycol and/or a tripropylene glycol.

Additionally, the polyol may include a polyester polyol. The polyester polyol may be made by a polycondensation reaction of an acid or corresponding anhydride with a polyhydric alcohol. Suitable acids for example include, but are not limited to, benzoic acid, maleic acid, adipic acid, phthalic acid, isophthalic acid, terephthalic acid and sebacic acid as well as their corresponding anhydrides, and dimeric fatty acids and trimeric fatty acids and short oils. Suitable polyhydric alcohols include, but are not limited to, ethylene glycol, propylene glycol, diethylene glycol, 1,4-butanediol, 1,6-hexane diol, 2,2-dimethyl-1,3-propanediol, neopentyl glycol, tetraethylene glycol, polycarbonate diols, trimethylolethane, trimethylolpropane, glycerol, 1,4-cyclohexanediol, 1,4-cyclohexanedimethanol, and glycerol.

In another embodiment, the polyol may include a polyacrylate polyol. The polyacrylate polyol may be made by a copolymerization reaction of a hydroxyalkyl(meth)acrylate monomer, such as, for example, a hydroxy $C_1$-$C_8$ alkyl (meth)acrylate, with an acrylate monomer, such as, for example, a $C_1$-$C_{10}$ alkyl acrylate and a cyclo $C_6$-$C_{12}$ alkyl acrylate, or with a methacrylate monomer, such as, for example, a $C_1$-$C_{10}$ alkyl methacrylate and a cyclo $C_6$-$C_{12}$ alkyl methacrylate, or with a vinyl monomer, such as, for example, styrene, α-methylstyrene, vinyl acetate, vinyl versatate, or with a mixture of two or more of such monomers. Suitable hydroxyalkyl(meth)acrylate monomers include for example, hydroxyethyl acrylate, hydroxypropyl acrylate, hydroxyethyl methacrylate, hydroxypropyl methacrylate. Suitable alkyl (meth)acrylate monomers include, for example, methyl methacrylate, ethyl methacrylate, butyl methacrylate, butyl acrylate, ethylhexyl methacrylate, isobornyl methacrylate. Suitable polyacrylate polyols include, for example, hydroxy($C_2$-$C_8$)alkyl (meth)acrylate-co-($C_2$-$C_8$)alkyl (meth)acrylate copolymers.

The polyol may also include a sugar alcohol. For instance, the sugar alcohol may be a sucrose based alcohol. For instance, the polyol may be a sorbitol or a sorbitol based polyol. The sorbitol may be an ethoxylated and/or propoxylated sorbitol.

In a further embodiment, the polyol may be a dendritic polyol. Like other polyols, the dendritic polyols contain reactive hydroxyl groups with can react with other functional groups. Generally, such dendritic polyols can offer a large number of primary hydroxyl groups along a densely branched polymer backbone. The dendritic polyol may be a carbon based dendritic polyol or a silicon based dendritic polyol or a combination thereof. That is, the base polyol utilized for the formation of the dendritic polyol may include carbon, silicon, or a combination thereof. In one embodiment, the base polyol includes carbon. In another embodiment, the base polyol includes a combination of a silicon and carbon (i.e., a carbosilane). However, it should be understood that the base polyol may also include other atoms, such as another oxygen atom outside of the hydroxyl group.

In addition, to form the dendritic polyol, the base polyol should be a branched structure. For instance, from a central atom, there should be at least three, such as at least four substituent groups or branches that extend therefrom and allow the formation of a dendritic structure. In addition, the dendritic polyol may have an average degree of branching of more than zero and less than or equal to 1, such as from 0.2 to 0.8. Generally, according to definition, strictly linear polyols have a degree of branching of zero and ideally dendritic polyols have a degree of branching of 1.0. The average degree of branching may be determined by $^{13}$C-NMR spectroscopy.

In addition, the dendritic polyol may be a polyether polyol and/or a polyester polyol. In one embodiment, the dendritic polyol may be a polyether polyol. In another embodiment, the dendritic polyol may be a polyester polyol. In another embodiment, the dendritic polyol may be a combination of a polyether poly and a polyester polyol.

The dendritic polyol has at least 2, such as at least 3, such as at least 4, such as at least 5, such as at least 6, such as at least 8, such as at least 10, such as at least 15, such as at least 20, such as at least 30, such as at least 50, such as at least 100 terminal hydroxyl groups to 1000 or less, such as 500 or less, such as 100 or less, such as 75 or less, such as 50 or less, such as 25 or less, such as 15 or less, such as 10 or less terminal hydroxyl groups. The dendritic polyol has a molecular weight of at least 500 g/mol, such as at least 1,000 g/mol, such as at least 1,500 g/mol, such as at least 2,000 g/mol, such as at least 2,500 g/mol, such as at least 3,000 g/mol, such as at least 4,000 g/mol, such as at least 5,000 g/mol, such as at least 6,000 g/mol, such as at least 10,000 g/mol to 100,000 g/mol or less, such as 75,000 g/mol or less, such as 50,000 g/mol or less, such as 25,000 g/mol or less, such as 15,000 g/mol or less, such as 10,000 g/mol or less, such as 7,500 g/mol or less, such as 6,000 g/mol or less, such as 5,000 g/mol or less. While not necessarily limited, the dendritic polyol may be any of those available under the name Boltorn™.

When such dendritic polyols are employed, crosslinked networks can be obtained. For instance, crosslinked networks can be obtained via a condensation reaction with any silanes, in particular hydrolyzed silanes present in the formulation. In addition, reactions may occur with a melamine resin. In this regard, the dendritic polyol may serve as a crosslinking agent. In particular, a carbocation intermediate may be formed in the melamine resin. Thereafter, condensation may occur between the melamine resin and the dendritic polyol. Such reactions may occur via SN1 mechanisms. In addition to such reactions, the dendritic polyol may also react with the glass substrate. That is, the dendritic polyol may react with hydroxyl groups present on the glass substrate. Such reaction may improve the adhesive strength of the coating on the glass substrate thereby resulting in improved stud pull and cross-hatch properties.

Any of a variety of curing mechanisms may generally be employed to form the crosslinked polyol resin. In certain embodiments, for instance, a crosslinking agent may be employed to help facilitate the formation of crosslink bonds. For example, an isocyanate crosslinking agent may be employed that can react with amine or hydroxyl groups on the polyol polymerizable compound. The isocyanate crosslinking agent can be a polyisocyanate crosslinking agent. In addition, the isocyante crosslinking agent can be aliphatic (e.g., hexamethylene diisocyanate, isophorone diisocyanate, etc.) and/or aromatic (e.g., 2,4 tolylene diisocyanate, 2,6-tolylene diisocyanate, etc.). The reaction can provide urea bonds when reacting with an amine group and urethane bonds when reacting with a hydroxyl group. In yet another embodiment, a melamine crosslinking agent may be employed that can react with hydroxyl groups on the polyol polymerizable compound to form the crosslink bonds. Suitable melamine crosslinking agents may include, for instance, resins obtained by addition-condensation of an amine compound (e.g., melamine, guanamine, or urea) with formaldehyde. Particularly suitable crosslinking agents are fully or partially methylolated melamine resins, such as hexamethylol melamine, pentamethylol melamine, tetramethylol melamine, etc., as well as mixtures thereof. Such reactions can provide ether bonds when reacting a hydroxyl group of the polyol polymerizable compound with a hydroxyl group of the amine (e.g., melamine) crosslinking agent.

In one embodiment, the first crosslinked resin is a crosslinked polyol resin with urethane bonds formed by the polyol and the crosslinking agent. In this regard, the polyol is crosslinked with an isocyanate crosslinking agent. In another embodiment, the first crosslinked resin is a crosslinked polyol resin with ether bonds formed by the polyol and the crosslinking agent. In this regard, the polyol is crosslinked with an amine crosslinking agent containing hydroxyl groups, such as a melamine-formaldehyde crosslinking agent.

In general, reactions may occur via an SN1 mechanism in the presence of an acid catalyst (e.g., p-toluene sulfonic acid). For instance, when a melamine formaldehyde crosslinking agent is employed, a proton can be attacked by an oxygen atom (in —$CH_2OCH_3$) located in the melamine formaldehyde to generate a carbocation intermediate with —$CH_3OH$ remaining as the by-product. Then, the nucleophilic oxygen in the polyol can attack the electrophilic carbocation intermediate to create a chemical bond between the melamine-formaldehyde and the polyol.

The binder may also contain a silicon-containing resin. For instance, the silicon-containing resin may be a polysiloxane resin. In particular, the polysiloxane resin may be a polysilsesquioxane resin. In general, such a silicon-containing resin can be formed using any method generally known in the art. For instance, the silicon-containing resin can be formed by reacting organosilicon compounds, such as organosilane compounds. That is, the organosilicon compounds, such as the organosilane compounds, can be referred to as the polymerizable compounds of the silicon-containing resin.

These organosilicon compounds may include organosilane compounds, such as alkylsilanes including substituted alkyl silanes. The organosilicon compounds may also include organoalkoxysilanes, organofluorosilanes, etc. In this regard, the organosilicon compounds may include a combination of alkylsilane compounds and organoalkoxysilane compounds.

Examples of alkylsilane compounds include those having the following general formula:

$$Si(R^1)(R^2)(R^3)(R^4)$$

wherein, $R^1$, $R^2$, $R^3$, and $R^4$ are an alkyl.

As indicated above, $R^1$, $R^2$, $R^3$, and $R^4$ are an alkyl. For instance, the alkyl may have at least 1 carbon atom, such as at least 2 carbon atoms, such as at least 3 carbon atoms and may have 25 carbon atoms or less, such as 20 carbon atoms or less, such as 10 carbon atoms or less, such as 5 carbon atoms or less. Each group may be the same alkyl group or a different alkyl. For instance, in one embodiment, each group may be the same alkyl group. In one embodiment, at least three of the R groups may be the same alkyl group, such as a methyl group. In another embodiment, at least two of the R groups may be the same alkyl group, such as a methyl group. It should be understood that the alkyl groups may be substituted alkyl groups. Several examples of such compounds include, for instance, ethyltrimethylsilane $(CH_3CH_2Si(CH_3)_3)$, ethyltriethylsilane $(CH_3CH_2Si(CH_2CH_3)_3)$, phenyltrimethylsilane (phenyl-$Si(CH_3)_3$), phenyltriethylsilane (phenyl-$Si(CH_2CH_3)_3$), hexyltrimethylsilane $(CH_3(CH_2)_5Si(CH_3)_3)$, hexyltriethylsilane $(CH_3(CH_2)_5Si(CH_2CH_3)_3)$, etc., as well as combinations thereof.

Examples of organoalkoxysilane compounds include those having the following general formula:

$$R^5_a Si(OR^6)_{4-a}$$

wherein, a is from 0 to 3, and in some embodiments, from 0 to 1;

$R^5$ is an alkyl, alkenyl, aryl, heteroaryl, cycloalkyl, heterocyclyl, halo, or haloalkyl; and $R^6$ is an alkyl.

In certain embodiments, a is 0 such that that the organosilane compound is considered an organosilicate. One example of such a compound is tetraethyl orthosilicate $(Si(OC_2H_5)_4)$. In other embodiments, a is 1 such that the organosilane compound is considered a trialkoxysilane compound. In one embodiment, for instance, $R^5$ in the trialkoxysilane compound may be an alkyl, aryl, or haloalkyl (e.g., fluoroalkyl). Such group may have at least 1 carbon atom, such as at least 2 carbon atoms, such as at least 3 carbon atoms and may have 25 carbon atoms or less, such as 20 carbon atoms or less, such as 10 carbon atoms or less, such as 5 carbon atoms or less. Several examples of such trialkoxysilane compounds include, for instance, ethyltrimethoxysilane $(CH_3CH_2Si(OCH_3)_3)$, ethyltriethoxysilane $(CH_3CH_2Si(OCH_2CH_3)_3)$, phenyltrimethoxysilane (phenyl-$(OCH_3)_3$), phenyltriethoxysilane (phenyl-$(OCH_2CH_3)_3$), hexyltrimethoxylsilane $(CH_3(CH_2)_5Si(OCH_3)_3)$, hexyltriethoxylsilane $(CH_3(CH_2)_5Si(OCH_2CH_3)_3)$, heptadecapfluoro-1,2,2-tetrahydrodecyltrimethoxysilane $(CF_3(CF_2)_7(CH_2)_2Si(OCH_3)_3)$, 3-glycidoxypropyltrimethoxysilane $(CH_2(O)CH-CH_2O-(CH_2)_3-Si(OCH_3)_3)$, etc., as well as combinations thereof.

In one embodiment, the silicon-containing resin is made from organosilicon compounds consisting of the organoalkoxysilane compounds as mentioned above.

Any of a variety of curing mechanisms may generally be employed to form the silicon-containing resin. For instance, the alkoxysilanes can undergo a hydrolysis reaction to convert the $R^6$ groups into hydroxyl groups. Thereafter, the hydroxyl groups can undergo a condensation reaction to form a siloxane functional group. In general, reactions may occur via an SN2 mechanism in the presence of an acid. For instance, silanes may be hydrolyzed and then condensed to form the crosslinked network. In addition, the hydrolyzed silanes may also react with silica particles, such as silica nanoparticles, when employed.

To initiate the reaction, the organosilane compound may initially be dissolved in a solvent to form a solution. Particularly suitable are organic solvents, such as hydrocarbons (e.g., benzene, toluene, and xylene); ethers (e.g., tetrahydrofuran, 1,4-dioxane, and diethyl ether); ketones (e.g., methyl ethyl ketone); halogen-based solvents (e.g., chloroform, methylene chloride, and 1,2-dichloroethane); alcohols (e.g., methanol, ethanol, isopropyl alcohol, and isobutyl alcohol); and so forth, as well as combinations of any of the foregoing. Alcohols are particularly suitable for use in the present invention. The concentration of the organic solvent within the solution may vary, but is typically employed in an amount of from about 70 wt. % to about 99 wt. %, in some embodiments from about 80 wt. % to about 98 wt. %, and in some embodiments, from about 85 wt. % to about 97 wt. % of the solution. Organosilane compounds may likewise constitute from about 1 wt. % to about 30 wt. %, in some embodiments from about 2 wt. % to about 20 wt. %, and in some embodiments, from about 3 wt. % to about 15 wt. % of the solution.

In one embodiment, the binder may also contain an epoxy resin. In general, such an epoxy resin can be formed using any method generally known in the art. The epoxy resins can be synthesized from any compounds that contain an epoxy component. Such compounds may include at least one epoxide functional group, such as at least two epoxide functional groups. In general, an epoxy compound is a compound that includes epoxide groups and may be reacted or cross-linked. These compounds containing the epoxide functional groups can be referred to as the polymerizable compounds of the epoxy resins.

Suitable epoxy resins include, but are not limited to, epoxy resins based on bisphenols and polyphenols, such as, bisphenol A, tetramethylbisphenol A, bisphenol F, bisphenol S, tetrakisphenylolethane, resorcinol, 4,4'-biphenyl, dihydroxynaphthylene, and epoxy resins derived from novolacs, such as, phenol:formaldehyde novolac, cresol:formaldehyde novolac, bisphenol A novolac, biphenyl-, toluene-, xylene, or mesitylene-modified phenol:formaldehyde novolac, aminotriazine novolac resins and heterocyclic epoxy resins derived from p-amino phenol and cyanuric acid. Additionally, aliphatic epoxy resins derived from 1,4-butanediol, glycerol, and dicyclopentadiene skeletons, are suitable. Examples of heterocyclic epoxy compounds are diglycidylhydantoin or triglycidyl isocyanurate.

In certain embodiments, the epoxy resins may include a diglycidyl ether. For instance, the epoxy resins may be non-aromatic hydrogenated cyclohexane dimethanol and diglycidyl ethers of hydrogenated Bisphenol A-type epoxide resin (e.g., hydrogenated bisphenol A-epichlorohydrin epoxy resin), cyclohexane dimethanol. Other suitable non-aromatic epoxy resin may include cycloaliphatic epoxy resins.

Additionally, the epoxy compound may be a combination of an epoxy compound and an acrylate compound. For instance, such compound may be an epoxy acrylate oligomer, such as an epoxy diacrylate, an epoxy tetraacrylate, or a combination thereof. For example, such compound may be a bisphenol A epoxy diacrylate, bisphenol A epoxy tetraacrylate, or a combination thereof. Such acrylate may be any of those referenced herein. For instance, the compound may be a bisphenol A epoxy dimethacrylate or a bisphenol A epoxy tetramethacrylate. Such oligomers may also be modified to include a substituent group. For instance, such substituent group may include an amine, a carboxyl group (e.g., a fatty acid), etc.

In addition, the epoxy groups of the resins may be crosslinked using any method and using any crosslinking agent generally employed in the art. The crosslinking agent may be an amine, an amide, an acid, a phenol, an alcohol, etc. In one embodiment, the crosslinking agent may be an amine. In one embodiment, the crosslinking agent may be a diamine, a triamine, or a combination thereof. In another embodiment, the crosslinking agent may be an amide. In one embodiment, the crosslinking agent may be an acrylate, such as a diacrylate or a triacrylate. In general, an initiator (e.g., benzoyl peroxide) can be used to form a free radical which can attack a double bond on a crosslinking agent or oligomer to form monomeric free radicals which can then subsequently attack other oligomers and form a three dimensional crosslinked network.

Without intending to be limited by theory, it is believed that crosslinking can be employed to improve the integrity of the coating.

In one embodiment, the binder may also contain an acrylate resin. The acrylate resin may be one derived from acrylic acid, methacrylic acid, or a combination thereof. For instance, the acrylate monomer includes, but is not limited to, methyl acrylate, ethyl acrylate, n-propyl acrylate, i-propyl acrylate, n-butyl acrylate, s-butyl acrylate, i-butyl acrylate, t-butyl acrylate, n-amyl acrylate, amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof.

In one embodiment, the acrylate monomers may be diacrylate monomers. For instance, the acrylate monomers may be diacrylate monomers including, but not limited to, methyl diacrylate, ethyl diacrylate, n-propyl diacrylate, i-propyl diacrylate, n-butyl diacrylate, s-butyl diacrylate, i-butyl diacrylate, t-butyl diacrylate, n-amyl diacrylate, i-amyl diacrylate, isobornyl diacrylate, n-hexyl diacrylate, 2-ethylbutyl diacrylate, 2-ethylhexyl diacrylate, n-octyl diacrylate, n-decyl diacrylate, methylcyclohexyl diacrylate, cyclopentyl diacrylate, cyclohexyl diacrylate, methyl dimethacrylate, ethyl dimethacrylate, 2-hydroxyethyl dimethacrylate, n-propyl dimethacrylate, n-butyl dimethacrylate, i-propyl dimethacrylate, i-butyl dimethacrylate, n-amyl dimethacrylate, n-hexyl dimethacrylate, i-amyl dimethacrylate, s-butyl-dimethacrylate, t-butyl dimethacrylate, 2-ethylbutyl dimethacrylate, methylcyclohexyl dimethacrylate, cinnamyl dimethacrylate, crotyl dimethacrylate, cyclohexyl dimethacrylate, cyclopentyl dimethacrylate, 2-ethoxyethyl dimethacrylate, isobornyl dimethacrylate, etc., as well as combinations thereof.

In general, the acrylate monomers may be aliphatic monomers. For instance, the monomers may be used to form aliphatic oligomers. In this regard, in one embodiment, the aliphatic monomers or oligomers may not contain any aromatic components.

The monomers may also include any derivatives of the aforementioned. In general, these monomers can be referred to as the polymerizable compounds of the acrylate resins.

In one embodiment, the acrylate resin is made from monomers including the monoacrylates and the diacrylates. In another embodiment, the monomers consist of the diacrylate monomers.

The acrylate resins may also further include a glycidyl functional group. For instance, the acrylate monomer may be a glycidyl group containing acrylate monomer such that the glycidyl group is not part of the backbone but instead imparts functionality to the acrylate monomer.

In general, these acrylate resins can be synthesized according to any method known in the art. The acrylate resins can be formed in one reaction step or in more than one reaction step. If multiple steps are employed, a prepolymer may be formed initially which can then undergo further reactions to synthesize the acrylate resins disclosed herein.

In addition, the glycidyl or epoxy groups of the resins may be crosslinked. Crosslinking may be performed using any method and using any crosslinking agent generally employed in the art. The crosslinking agent may be an amine, an amide, an acrylate, or a combination thereof. In one embodiment, the crosslinking agent may be an amine. In one embodiment, the crosslinking agent may be a diamine, a triamine, or a combination thereof. In another embodiment, the crosslinking agent may be an amide. In a further embodiment, the crosslinking agent may be an acrylate. For instance, the acrylate may be an ethoxylated acrylate, such as an ethoxylated trimethylolpropane triacrylate. Without intending to be limited by theory, it is believed that crosslinking can be employed to improve the integrity of the coating.

In general, an initiator (e.g., benzoyl peroxide) can be used to form a free radical which can attack a double bond on a crosslinking agent, monomer or oligomer to form free radicals which can then subsequently attack other monomers or oligomers and form a three dimensional crosslinked network.

In addition to the above, the binder may also include a fourth resin. The fourth resin may be a thermoplastic resin. In particular, the fourth polymer may be any polymer that can be introduced into the network of the binder. In particular, the fourth resin may be one that can thermally decompose to release monomers during decomposition and allow for the reduction of bubbles. These polymers can include polymethacrylonitrile, a polystyrene (e.g., poly(styrene-co-methyl methacrylate, poly($\alpha$-methylstyrene), poly(p-bromostyrene), poly(p-chlorostyrene), poly(p-methoxystyrene), poly(p-methylstyrene), poly(deuterostyrene), poly(trifluorostyrene), etc.), polyoxymethylene, polytetrafluoroethylene, polycarbonate (e.g., polypropylene carbonate, polyethylene carbonate, etc.), polyglycol (e.g., polyethylene glycol, polyethylene glycol-propylene glycol-ethylene glycol, polypropylene glycol, etc.), and etc. In one embodiment, the fourth resin includes a poly(styrene-co-methyl methacrylate) copolymer. In this regard, such fourth resin may be a linear polymer. For instance, the fourth resin may be one that is not crosslinked.

In general, the crosslinked resins form crosslinks with itself. That is, for example, the first crosslinked resin is formed by reacting a polyol with a crosslinking agent. The second crosslinked resin is formed by reacting silicone-containing compounds. However, in one embodiment, one resin may form covalent bonds with another resin. For instance, the first crosslinked polyol resin may also have some covalent bonds with another resin, such as the silicon-containing resin. In addition, silica particles, such as silica nanoparticles, when employed, can also be used to react with the polyol resin to introduce nanoparticles into the crosslinked polyol resin.

Each resin independently of one another may be present in an amount of greater than 0 wt. %, such as about 1 wt. % or more, such as about 2 wt. % or more, such as about 5 wt. % or more, such as about 7 wt. % or more, such as about 10 wt. % or more, such as about 20 wt. % or more, such as about 25 wt. % or more, such as about 30 wt. % or more, such as about 40 wt. % or more to less than 100 wt. %, such as about 90 wt. % or less, such as about 75 wt. % or less, such as about 60 wt. % or less, such as about 50 wt. % or less, such as about 40 wt. % or less, such as about 30 wt. % or less, such as about 25 wt. % or less, such as about 20 wt. % or less, such as about 10 wt. % or less based on the total weight of the binder resins. That is, the first resin, the second resin, the third resin, and if present, the fourth resin may be present in any of the aforementioned concentrations based on the total weight of the binder resins.

The binder typically constitutes about 1 wt. % or more, such as about 2 wt. % or more, such as about 3 wt. % or more, such as about 5 wt. % or more to about 20 wt. % or less, such as about 15 wt. % or less, such as about 12 wt. % or less, such as about 11 wt. % or less, such as about 10 wt. % or less of the coating. Such concentration may be for a coating after curing and prior to tempering. After tempering, the binder or the remnants of the binder may be present in the coating in an amount of 0.1 wt. % or more, such as about 0.5 wt. % or more, such as about 1 wt. % or more, such as about 2 wt. % or more to about 10 wt. % or less, such as about 7 wt. % or less, such as about 5 wt. % or less.

The first crosslinked resin, such as a crosslinked polyol resin, constitutes about 1 wt. % or more, such as about 2 wt. % or more, such as about 3 wt. % or more, such as about 5 wt. % or more to about 20 wt. % or less, such as about 15 wt. % or less, such as about 12 wt. % or less, such as about 11 wt. % or less, such as about 10 wt. % or less of the coating. The second crosslinked resin constitutes about 1 wt. % or more, such as about 2 wt. % or more, such as about 3 wt. % or more, such as about 5 wt. % or more to about 20 wt. % or less, such as about 15 wt. % or less, such as about 12 wt. % or less, such as about 11 wt. % or less, such as about 10 wt. % or less of the coating. The third resin constitutes about 1 wt. % or more, such as about 2 wt. % or more, such as about 3 wt. % or more, such as about 5 wt. % or more to about 20 wt. % or less, such as about 15 wt. % or less, such as about 12 wt. % or less, such as about 11 wt. % or less, such as about 10 wt. % or less of the coating. Such concentration may be for a coating after curing and prior to tempering.

After tempering, the first crosslinked resin or the remnants thereof may be present in the coating in an amount of 0 wt. % or more, such as about 0.001 wt. % or more, such as about 0.01 wt. % or more, such as about 0.1 wt. % or more, such as about 0.5 wt. % or more, such as about 1 wt. % or more, such as about 2 wt. % or more to about 10 wt. % or less, such as about 7 wt. % or less, such as about 5 wt. % or less. After tempering, the second crosslinked resin or the remnants thereof may be present in the coating in an amount of 0 wt. % or more, such as about 0.001 wt. % or more, such as about 0.01 wt. % or more, such as about 0.1 wt. % or more, such as about 0.5 wt. % or more, such as about 1 wt. % or more, such as about 2 wt. % or more to about 10 wt. % or less, such as about 7 wt. % or less, such as about 5 wt. % or less. After tempering, the third resin or the remnants thereof may be present in the coating in an amount of 0 wt. % or more, such as about 0.001 wt. % or more, such as about 0.01 wt. % or more, such as about 0.1 wt. % or more, such as about 0.5 wt. % or more, such as about 1 wt. % or more, such as about 2 wt. % or more to about 10 wt. % or less, such as about 7 wt. % or less, such as about 5 wt. % or less.

B. Glass Frit

As indicated herein, the coating may include a glass frit. For instance, the glass frit may help adhere the polymers to the glass substrate. The glass frit may have a melting temperature of from about 400° C. to about 700° C., and in some embodiments, from about 500° C. to about 600° C.

The glass frit typically contains $SiO_2$ in an amount of from about 25 mol. % to about 55 mol. %, in some embodiments from about 30 mol. % to about 50 mol. %, and in some embodiments, from about 35 mol. % to about 45 mol. %. Other oxides may also be employed. For example, alkali metal oxides (e.g., $Na_2O$ or $K_2O$) may constitute from about 5 mol. % to about 35 mol. %, in some embodiments from about 10 mol. % to about 30 mol. %, and in some embodiments, from about 15 mol. % to about 25 mol. % of the frit. $Al_2O_3$ may also be employed in an amount from about 1 mol. % to about 15 mol. %, in some embodiments from about 2 mol. % to about 12 mol. %, and in some embodiments, from about 5 mol. % to about 10 mol. % of the frit.

In other embodiments, the glass frit may also contain a transition metal oxide (e.g., ZnO) as a melting point suppressant, such as in an amount from about 5 mol. % to about 40 mol. %, in some embodiments from about 10 mol. % to about 35 mol. %, and in some embodiments, from about 15 mol. % to about 30 mol. % of the frit.

The glass frit may also include oxides that help impart the desired color and to provide a colored glass frit. For example, titanium dioxide ($TiO_2$) may be employed to help provide a white color, such as in an amount of from about 0.1 mol. % to about 10 mol. %, in some embodiments from about 0.5 mol. % to about 8 mol. %, and in some embodiments, from about 1 mol. % to about 5 mol. % of the frit. Likewise, bismuth oxide ($Bi_2O_3$) may be employed in certain embodiments to help provide a black color. When employed, $Bi_2O_3$ may constitute from about 10 mol. % to about 50 mol. %, in some embodiments from about 25 mol. % to about 45 mol. %, and in some embodiments, from about 30 mol. % to about 40 mol. % of the frit.

The glass frit is typically present in the coating in an amount of about 40 wt. % or more, such as about 50 wt. % or more, such as about 60 wt. % or more, such as about 70 wt. % or more to about 99 wt. % or less, such as about 95 wt. % or less, such as about 90 wt. % or less, such as about 85 wt. % or less, such as about 80 wt. % or less, such as about 70 wt. % or less. Such concentration may be for a coating after curing and/or after tempering.

C. Optional Additives

The coating may also include any number of additives as generally known in the art. In general, these additives may be added to the coating formulation containing the polymerizable compounds. In this regard, the additives may be present during polymerization and/or crosslinking of the polymerizable compounds and resin. In some instances, the additives may form covalent bonds with the polymerizable compounds and/or a resin.

i. Colorants

As indicated herein, the coating may include at least one colorant. For instance, the colorant may include a pigment, a dye, or a combination thereof. For instance, the colorant may be an inorganic pigment, a fluorescent colorant, or a combination thereof. The colorant may be employed to provide a certain color the glass substrate and/or coating.

As indicated above, the pigment may be an inorganic pigment. Examples of such pigments may include, for instance, metallic pigments (e.g., aluminum flake, copper bronze flake, and metal oxide coated mica), white pigments (e.g., titanium dioxide, zinc oxide, etc.), black pigments (e.g., carbon black, iron black, titanium black, etc.), green pigments (e.g., chromium oxide pigments, copper pigments, etc.), red/orange/yellow pigments (e.g., iron oxide pigments, etc.), and so forth. The pigments may include metal oxides such as an oxide of a metal selected from the group consisting of aluminum, antimony, bismuth, boron, chrome, cobalt, gallium, indium, iron, lanthanum, lithium, magnesium, manganese, molybdenum, neodymium, nickel, niobium, silium, tin, vanadium, and zinc. In particular, the pigment may include a cobalt chromite blue-green spinel, a cobalt chromite green spinel, a chromium antimony titanium, a nickel antimony titanium, and so forth. It should be understood that any of the aforementioned pigments may be used in combination.

As indicated above, the colorant may be a fluorescent colorant such as a fluorescent pigment or dye. In general, by providing a glass article with fluorescence, without intending to be limited by theory, the glass article and coating may be able to absorb light of varying frequencies and possess the ability to re-emit this energy as light of a longer wavelength causing the material to produce a brilliant "glow" of light. In general, a fluorescent body has the capacity to convert short wavelength (high energy) photons of light into a predominantly longer and more intense wavelength of energy. This is in contrast to a conventional colorant, which can only reflect the small portion of light from the visible spectrum that provides its unique color.

For example, a conventional colorant such as orange can absorb white light and reflect only the orange band (approx. 600 nm) of the visible spectrum. The rest of the spectrum (red, yellow, green, blue, indigo, and violet) may be dissipated as heat. A fluorescent orange color however, may absorb white light and convert the lower wavelength colors (yellow, green, blue, indigo, violet) along with longer UV energy into a single, more intense band of light as opposed to losing these wavelengths as heat.

Generally, the fluorescent colorants may be any pigment or dye as generally known in the art. For instance, these may include inorganic fluorescents (e.g., zinc sulfide or cadmium sulfide doped with another transition or rare earth element), optical whiteners, daylight fluorescents, or any combination thereof. The fluorescent colorants may also include organic fluorescent pigments. The pigments may include rhodamines, fluoresceins, coumarins, naphthalimides, benzoxanthenes and acridines. Typical dyes include Basic Red 1, Basic Violet 10, Basic Violet 11, Basic Violet 16, Basic Yellow 40, Solvent Yellow 44, Solvent Yellow 131 and Solvent Yellow 135. Additionally, commonly known fluorescent pigments include those sold commercially as Day-Glo® pigments. Others also include those sold commercially under the UVL name by QCR Solutions.

The fluorescent colorant may have a particle size of about 1 micron or greater, such as about 1.5 microns or greater, such as about 2 microns or greater, such as about 4 microns or greater to about 10 microns or less, such as about 8 microns or less, such as about 7 microns or less, such as about 6 microns or less.

The fluorescent colorant may have an excitation within a range of from 350 nm to 450 nm, such as from 350 nm to 425 nm, such as from 350 nm to 400 nm, such as from 350 nm to 375 nm, such as from 360 nm to 370 nm.

Another class of light emitting colorants includes the phosphorescent pigments which are a family of pigments, generally inorganic sulfide crystals of fairly large and controlled size, that absorb the energy of incident light then slowly re-emit it as radiation of a color specific to each pigment. The phosphorescence gradually dims in darkness, to be renewed by the next light re-stimulation.

When employed, the colorants may constitute 0.1 wt. % or more, such as about 0.5 wt. % or more, such as about 1 wt. % or more, such as about 2 wt. % or more, such as about 5 wt. % or more to about 40 wt. % or less, such as about 35 wt. % or less, such as about 30 wt. % or less, such as about 25 wt. % or less, such as about 20 wt. % or less, such as about 15 wt. % or less of the coating. Such concentration may be for a coating after curing and/or after tempering.

ii. Light Stabilizers

As indicated herein, the coating may include at least one light stabilizer. For instance, the light stabilizer may comprise a UV absorber, a hindered amine, or a combination thereof. In general, UV absorbers may be employed in the coating to absorb ultraviolet light energy. Meanwhile, hindered amine light stabilizers may be employed in the coating to inhibit degradation of the resins and coating thereby providing color stability and extending its durability. As a result, in some embodiments, a combination of a UV absorber and a hindered amine light stabilizer may be employed.

As indicated herein, the coating may contain at least one UV absorber. Suitable UV absorbers may include, for instance, benzophenones, benzotriazoles, triazines, and combinations thereof.

Suitable benzotriazoles may include, for instance, 2-(2-hydroxyphenyl)benzotriazoles, such as 2-(2-hydroxy-5-methylphenyl)benzotriazole; 2-(2-hydroxy-5-tert-octylphenyl)benzotriazole; 2-(3-(2H-benzotriazol-2-yl)-4-hydroxyphenyl)ethyl methacrylate; 2-(2-hydroxy-3,5-di-tert-butylphenyl)-5-chlorobenzo-triazole; 2-(2-hydroxy-3-tert-butyl-5-methylphenyl)-5-chlorobenzotriazole; 2-(2-hydroxy-3,5-dicumylphenyl)benzotriazole; 2,2'-methylenebis(4-tert-octyl-6-benzo-triazolylphenol); polyethylene glycol ester of 2-(2-hydroxy-3-tert-butyl-5-carboxyphenyl)benzotriazole; 2-[2-hydroxy-3-(2-acryloyloxyethyl)-5-m ethylphenyl]-benzotriazole; 2-[2-hydroxy-3-(2-methacryloyloxyethyl)-5-tert-butylphenyl]benzotriazole; 2-[2-hydroxy-3-(2-methacryloyloxyethyl)-5-tert-octylphenyl]benzotriazole; 2-[2-hydroxy-3-(2-methacryloyloxyethyl)-5-tert-butylphenyl]-5-chlorobenzotriazole; 2-[2-hydroxy-5-(2-methacryloyloxyethyl)phenyl]benzotriazole; 2-[2-hydroxy-3-tert-butyl-5-(2-methacryloyloxyethyl)phenyl]benzotriazole; 2-[2-hydroxy-3-tert-amyl-5-(2-methacryloyloxyethyl)phenyl]benzotriazole; 2-[2-hydroxy-3-tert-butyl-5-(3-methacryloyloxypropyl)phenyl]-5-chlorobenzotriazole; 2-[2-hydroxy-4-(2-methacryloyloxymethyl)phenyl]benzotriazole; 2-[2-hydroxy-4-(3-methacryloyloxy-2-hydroxypropyl)phenyl] benzotriazole; 2-[2-hydroxy-4-(3-methacryloyl-oxypropyl) phenyl]benzotriazole; allyloxy-1,3,5 triazinyl-2-hydroxyphenylbenzotriazole; and combinations thereof.

Suitable benzophenones may include, for instance, 2-hydroxy-4-dodecyloxybenzophenone; 2,4-dihydroxybenzophenone; 2-(4-benzoyl-3-hydroxyphenoxy) ethyl acrylate; 2-hydroxy-4-n-octyloxy)benzophenone; 2,2'-dihydroxy-4-(octyloxy)benzophenone; hexadecyl-3,5-bis-tert-butyl-4-hydroxybenzoate; 2,2'-thiobis(4-tert-octylphenolato)-n-butylamine nickel(II); 3,5-di-tert-butyl-4-hydroxybenzoic acid, (2,4-di-tert-butylphenyl) ester; 4,4'-dimethoxy-2,2'-dihydroxybenzophenone; and combinations thereof.

Suitable triazines may include, for instance, 1,3,5-tris(2-hydroxyethyl)isocyanurate; tris(2,3-epoxypropyl)isocyanurate; (1,3,5-triallyl-1,3,5-triazine-2,4,6(1H,3H,5H)-trione; allyloxy-(1,3,5) triazinylpiperidine; allyloxy-1,3,5 triazinyl-2-hydroxy-phenylbenzotriazole; and combinations thereof.

As indicated herein, the coating may contain at least one hindered amine light stabilizer ("HALS"). Suitable HALS compounds may be piperidine-based compounds. For instance, they may be derived from a substituted piperidine, such as an alkyl-substituted piperidyl, piperidinyl, piperazinone, alkoxypiperidinyl compounds, and so forth. For example, the hindered amine may be derived from a 2,2,6,6-tetraalkylpiperidine, such as 2,2,6,6-tetramethylpiperidine.

Regardless of the compound from which it is derived, the hindered amine may be an oligomeric or polymeric compound. The compound may have a number average molecular weight of about 1,000 or more, in some embodiments from about 1,000 to about 20,000, in some embodiments from about 1,500 to about 15,000, and in some embodiments, from about 2,000 to about 5,000.

Examples of hindered amines include, for instance, an oligomer of N-(2-hydroxyethyl)-2,2,6,6-tetramethyl-4-piperidinol and succinic acid; oligomer of cyanuric acid and N,N-di(2,2,6,6-tetramethyl-4-piperidyl)-hexamethylene diamine; 2,2,6,6-tetramethylpiperidine-2-hydroxyphenyl-benzotriazole; poly((6-morpholine-S-triazine-2,4-diyl)(2,2,6,6-tetramethyl-4-piperidinyl)-iminohexamethylene-(2,2,6,6-tetramethyl-4-piperidinyl)-imino); polymethylpropyl-3-oxy-[4(2,2,6,6-tetramethyl)-piperidinylysiloxane; copolymer of α-methylstyrene-N-(2,2,6,6-tetramethyl-4-piperidinyl)maleimide and N-stearyl maleimide; 2,4,8,10-tetraoxaspiro[5.5]undecane-3,9-diethanol tetramethyl-polymer with 1,2,3,4-butanetetracarboxylic acid; and so forth.

In addition to the high molecular weight hindered amines, low molecular weight hindered amines may also be employed. Such hindered amines are generally monomeric in nature and have a molecular weight of about 1,000 or less, in some embodiments from about 155 to about 800, and in some embodiments, from about 300 to about 800. Specific examples of such low molecular weight hindered amines may include, for instance, bis-(2,2,6,6-tetramethyl-4-piperidyl) sebacate; bis-(1,2,2,6,6-pentamethyl-4-piperidinyl)-(3,5-ditert.butyl-4-hydroxybenzyl)butyl-propane dioate; bis-(1,2,2,6,6-pentamethyl-4-piperidinyl) sebacate; 8-acetyl-3-dodecyl-7,7,9,9-tetramethyl-1,3,8-triazaspiro-(4,5)-decane-2,4-dione; butanedioic acid-bis-(2,2,6,6-tetramethyl-4-piperidinyl) ester; tetrakis-(2,2,6,6-tetramethyl-4-piperidyl)-1,2,3,4-butane tetracarboxylate; 7-oxa-3,20-diazadispiro(5.1.11.2) heneicosan-20-propanoic acid, 2,2,4,4-tetramethyl-21-oxo, dodecyl ester; N-(2,2,6,6-tetramethyl-4-piperidinyl)-N'-amino-oxamide; o-t-amyl-o-(1,2,2,6,6-pentamethyl-4-piperidinyl)-monoperoxi-carbonate; β-alanine, N-(2,2,6,6-tetramethyl-4-piperidinyl), dodecylester; ethanediamide, N-(1-acetyl-2,2,6,6-tetramethylpiperidinyl)-N'-dodecyl; 3-dodecyl-1-(2,2,6,6-tetramethyl-4-piperidinyl)-pyrrolidin-2,5-dione; 3-dodecyl-1-(1,2,2,6,6-pentamethyl-4-piperidinyl)-pyrrolidin-2,5-dione; 3-dodecyl-1-(1-acetyl,2,2,6,6-tetramethyl-4-piperidinyl)-pyrrolidin-2,5-dione; 4-benzoyloxy-2,2,6,6-tetramethylpiperidine; 1-[2-(3,5-di-tert-butyl-4-hydroxyphenylpropionyloxy)ethyl]-4-(3,5-di-tert-butyl-4-hydroxylphenyl propionyloxy)-2,2,6,6-tetramethyl-piperidine; 2-methyl-2-(2",2",6",6"-tetramethyl-4"-piperidinylamino)-N-(2',2',6',6'-tetra-methyl-4'-piperidinyl) propionylamide; 1,2-bis-(3,3,5,5-tetramethyl-2-oxo-piperazinyl) ethane; 4-oleoyloxy-2,2,6,6-tetramethylpiperidine; 2,4-bis (N-butyl-N-(1-cyclohexyloxy-2,2,6,6-tetramethylpiperidin-4-yl) amino)-6-(2-hydroxyethylamine)-1,3,5-triazine, and combinations thereof.

It should be understood that the UV absorbers and HALS are not necessarily limited to the above and may include any other compounds known in the art.

In addition, the light stabilizer may be a polymerizable light stabilizer. In this regard, the polymerizable light stabilizer can be directly attached to a resin, such as a resin in the binder. Such attachment can provide a benefit of minimizing or removing the mobility of the light stabilizer. Such light stabilizers can simply be reacted via a functional group with a functional group of a resin during curing. These polymerizable light stabilizers may contain a carbon-carbon double bond, a hydroxyl group, a carboxyl group, an active ester group, and/or an amine group that allows for the light stabilizer to be covalently attached with the resins. In essence, the light stabilizer would be a part of the backbone of the resin either in an intermediate part of the resin or a terminal part of the resin. Suitably, the light stabilizer is present in an intermediate part of the resin.

For instance, the UV stabilizer may contain a polymerizable group. The polymerizable compounds may include, but are not limited to, 2-[3-(2H-benzotriazol-2-yl)-4-hydroxyphenyl)ethyl methacrylate; 2,2,6,6-tetramethylpiperidine; 2-(4-benzoyl-3-hydroxyphenoxy)ethyl acrylate; 1,3,5-tris(2-hydroxyethyl)isocyanurate; tris(2,3-epoxypropyl) isocyanurate; 1,3,5-triallyl-1,3,5-triazine-2,4,6(1H,3H,5H)-trione; 2,2,5,5-tetramethylpiperidine-2-hydroxyphenylbenzotriazole; allyloxy-(1,3,5) triazinylpiperidine; allyloxy-1,3,5 triazinyl-2-hydroxyphenylbenzotriaole, etc. or a combination thereof.

The polymerizable light stabilizer can be polymerized with the components of a polyol resin. For instance, the polymerizable light stabilizer can be polymerized with a polyol and an isocyanate coupling agent. For instance, the light stabilizer (e.g., a hindered amine light stabilizer), a polyol, and a polyisocyanate can be mixed and a functional group (e.g., hydroxyl group) of the light stabilizer can be reacted with the isocyanate group of the polyisocyanate. The polyisocyanate can be condensed with a polyol to form a polymer resin.

The polymerizable light stabilizer can also be polymerized with the components of the silicon-containing resin. For instance, the polymerizable light stabilizer can be polymerized with the organosilanes, in particular the organoalkoxysilanes. For instance, the light stabilizer (e.g., a hindered amine light stabilizer) and the organoalkoxysilane can be mixed and a functional group (e.g., hydroxyl group) of the light stabilizer can react with the alkoxy group of the organoalkoxysilane to form a polymer resin.

In addition, the stabilizer can also be attached using a crosslinking agent. For instance, the crosslinking agent may be an isocyanate, such as a diisocyanate as mentioned herein.

When employed, the light stabilizers may constitute about 0.0001 wt. % or more, such as about 0.001 wt. % or more, such as about 0.01 wt. % or more, such as about 0.1 wt. % or more, such as about 0.2 wt. % or more, such as about 0.5 wt. % or more, such as about 1 wt. % or more, such as about 2 wt. % or more to about 20 wt. % or less, such as about 15 wt. % or less, such as about 10 wt. % or less, such as about 5 wt. % or less, such as about 3 wt. % or less of the coating. Such concentration may be for a coating after curing and/or after tempering.

iii. Metal Alkoxides

As indicated herein, the coating may include at least one metal alkoxide. Examples of metal alkoxides that may be employed include those have the following general formula:

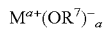

wherein,
 a is from 1 to 3;
 $R^7$ is an alkyl or cycloalkyl; and
 M is a metal cation.

As indicated in the formula above, "a" is from 1 to 3. However, "a" may be from 1 to 2 or 2 to 3. In certain embodiments, "a" may be 1 while in others "a" may be 2. In one particular embodiment, "a" may be 3.

As also indicated in the formula above, $R^7$ is an alkyl or cycloalkyl. For instance, $R^7$ may be an alkyl. The alkyl may have 1 or more, such as 2 or more, such as 3 or more, such as 4 or more to 10 or less, such as 8 or less, such as 6 or less, such as 5 or less carbon atoms. For instance, the alkyl may have from 1 to 10, such as from 1 to 6, such as from 1 to 5, such as from 1 to 4, such as from 2 to 4 carbon atoms.

As also indicated in the formula above, "M" is a metal cation. The metal may be a Group IA, IIA, IIIA, IVA, VA, VIA, IB, IIB IIIB, IVB, VB, VIB, VIIB, or VIIIB metal. For instance, the metal, while not necessarily limited to the following, may be aluminum, cobalt, copper, gallium, germanium, hafnium, iron, lanthanum, molybdenum, nickel, niobium, rhenium, scandium, silicon, sodium, tantalum, tin, titanium, tungsten, or zirconium. In one particular embodiment, the metal may be aluminum.

For instance, the metal alkoxide may include, but is not limited to, aluminum butoxide, titanium isopropoxide, titanium propoxide, titanium butoxide, zirconium isopropoxide, zirconium propoxide, zirconium butoxide, zirconium ethoxide, tantalum ethoxide, tantalum butoxide, niobium ethoxide, niobium butoxide, tin t-butoxide, tungsten (VI) ethoxide, germanium, germanium isopropoxide, and so forth.

In one embodiment, the metal alkoxide may be an aluminum alkoxide. For instance, the aluminum alkoxide may be an aluminum butoxide. The aluminum butoxide may be an aluminum tri-sec-butoxide, an aluminum tert-butoxide, or a combination thereof.

Without intending to be limited by theory, the present inventors have discovered that the metal cation of the metal alkoxide can be employed to bridge oxygens in the glass. That is, the metal cation can assist in bridging non-bridged oxygen atoms. In this regard, the metal cation can assist in forming and/or linking tetrahedra in the glass network. For instance, the metal alkoxide can become hydrolyzed to include a hydroxyl group. Then, hydroxyl groups of the metal alkoxide can be condensed to develop a crosslinked. In addition, a hybrid network may also form wherein the hydroxyl group of a metal alkoxide is condensed with the hydroxyl group of a silanol (e.g., from a hydrolyzed organoalkoxysilane used to form the silicon-containing resin). In this regard, the metal alkoxides may be discrete particles within the coating or may be bonded to a resin. With the use of such metal alkoxides, the present inventors have discovered that the integration of the glass network can be further enhanced. In addition, the present inventors have found that employing the metal alkoxides may also improve the water resistance of as coated glass.

When employed, the metal alkoxides may constitute about 0.0001 wt. % or more, such as about 0.001 wt. % or more, such as about 0.01 wt. % or more, such as about 0.1 wt. % or more, such as about 0.2 wt. % or more, such as about 0.5 wt. % or more, such as about 1 wt. % or more to about 10 wt. % or less, such as about 5 wt. % or less, such as about 2 wt. % or less, such as about 1 wt. % or less, such as about 0.5 wt. % or less, such as about 0.2 wt. % or less, such as about 0.1 wt. % or less of the coating. Such concentration may be for a coating after curing and/or after tempering.

iv. Nanoparticles

As indicated herein, the coating may include at least one nanoparticle. For instance, the nanoparticle may be a metalloid containing nanoparticle, a metal containing nanoparticle, or a combination thereof. These particles include, but are not limited to, $SiO_2$, $TiO_2$, $ZrO_2$, $Al_2O_3$, ZnO, CdO, SrO, PbO, $Bi_2O_3$, CuO, $Ag_2O$, $CeO_2$, AuO, $SnO_2$, etc.

The coating may contain at least one metalloid-containing nanoparticle. For instance, the nanoparticle may be a silicon-containing nanoparticle. That is, the nanoparticle may be a silica nanoparticle. Without intending to be limited by theory, the present inventors have discovered that the mechanical strength of the polymer network can be further enhanced by employing such silica nanoparticles. For instance, the silica particle may contain hydroxyl groups that can be condensed with the hydroxyl groups of a silane hydroxyl group of a silanol (e.g., from a hydrolyzed organoalkoxysilane used to form the silicon-containing resin). In addition, the silica particles may also react with a carbocation in the polyol resins via a condensation reaction. In this regard, the silicon-containing nanoparticles may be discrete particles within the coating or may be bonded to a resin.

The silica may be crystalline silica or amorphous silica. In one embodiment, the silica may be amorphous silica. Amorphous silica may include silica gels, precipitated silica, fumed silica, and colloidal silica. In one embodiment, the silica may be colloidal silica. For instance, the silica nanoparticles may substantially contain (e.g., 90 wt. % or more, such as 95 wt. % or more, such as 98 wt. % or more) of silicon dioxide.

In general, the silicon-containing nanoparticle may be one having a core with a silica surface. This includes nanoparticle cores that are substantially entirely silica, as well as nanoparticle cores comprising other inorganic (e.g., metal oxide) or organic cores having a silica surface. In some embodiments, the core comprises a metal oxide. Any known metal oxide may be used. Exemplary metal oxides include silica, titania, alumina, zirconia, vanadia, chromia, antimony oxide, tin oxide, zinc oxide, ceria, and mixtures thereof. However, the core may also comprise a non-metal oxide.

The silicon-containing nanoparticle may include a surface treatment. In general, surface treatment agents for silica nanoparticles are organic species having a first functional group capable of covalently chemically attaching to the surface of a nanoparticle, wherein the attached surface treatment agent alters one or more properties of the nanoparticle. The surface treated nanoparticle may be reactive (i.e., at least one of the surface treatment agents used to surface modify the nanoparticles may include a second functional group capable of reacting with one or more of the curable resin(s) and/or one or more of the reactive diluent(s) of the system).

Surface treatment agents often include more than one first functional group capable of attaching to the surface of a nanoparticle. For example, alkoxy groups are common first functional groups that are capable of reacting with free silanol groups on the surface of a silica nanoparticle forming a covalent bond between the surface treatment agent and the silica surface, Examples of surface treatment agents having multiple alkoxy groups include alkoxysilanes. For instance, these may include, but are not limited to trialkoxy alkylsilanes (e.g., methyltrimethoxysilane, isooctyltrimethoxysilane, and octadecyltrimethoxysilane), and trialkoxy arylsilanes (e.g., trimethoxy phenyl silane).

The silicon-containing nanoparticles may be provided in various forms, shapes, and sizes. The average size of the silicon-containing nanoparticles, such as the silica nanoparticles, is generally less than about 1 microns, such as about 500 nanometers or less, such as about 400 nanometers or less, such as about 300 nanometers or less, such as about 200 nanometers or less, such as about 100 nanometers or less to about 1 nanometer or more, such as about 2 nanometers or more, such as about 5 nanometers or more. As used herein, the average size of a nanoparticle refers to its average length, width, height, and/or diameter.

In one embodiment, the silicon-containing nanoparticles, such as the silica nanoparticles, may be elongated nanoparticles. For instance, the nanoparticles may have an average aspect ratio of more than 1, such as 2 or more, such as 3 or more, such as 5 or more to about 50 or less, such as about 30 or less, such as about 20 or less, such as about 15 or less, such as about 10 or less. For instance, the aspect ratio may be from greater than 1 to 50, such as from 2 to 25, such as from 3 to 15, such as from 5 to 10.

The silicon-containing nanoparticles, such as the silica nanoparticles, may have an average surface area of from about 50 square meters per gram ($m^2/g$) to about 1000 $m^2/g$, in some embodiments from about 100 $m^2/g$ to about 600 $m^2/g$, and in some embodiments, from about 180 $m^2/g$ to about 240 $m^2/g$. Surface area may be determined by the physical gas adsorption (B.E.T.) method of Brunauer, Emmet, and Teller, Journal of American Chemical Society, Vol. 60, 1938, p. 309, with nitrogen as the adsorption gas.

If desired, the silicon-containing nanoparticles, such as the silica nanoparticles, may also be relatively nonporous or solid. That is, the nanoparticles may have a pore volume that is less than about 0.5 milliliters per gram (ml/g), in some embodiments less than about 0.4 milliliters per gram, in some embodiments less than about 0.3 ml/g, and in some embodiments, from about 0.2 ml/g to about 0.3 ml/g.

In addition, the coating may contain at least one metal-containing nanoparticle. For instance, metal-containing nanoparticle may be a titanium-containing nanoparticle. For instance, the titanium-containing nanoparticle may be a titanium dioxide nanoparticle.

Without intending to be limited by theory, it is believed that the titanium-containing nanoparticles can be employed to serve as a self-cleaning additive. That is, the nanoparticles can be employed for cleaning and/or disinfecting surfaces exposed to light. For instance, the photocatalytic activity of the titania at a free surface or near-surface region of the coating attributes to the self-cleaning action. Titania is photocatalytically active with ultraviolet radiation and can be used to decompose organic materials from the surface of a coating.

The titanium-containing nanoparticles may be provided in various forms, shapes, and sizes. The average size of the titanium-containing nanoparticles, such as the titanium dioxide nanoparticles, is generally less than about 1 microns, such as about 500 nanometers or less, such as about 400 nanometers or less, such as about 300 nanometers or less, such as about 200 nanometers or less, such as about 100 nanometers or less to about 1 nanometer or more, such as about 2 nanometers or more, such as about 5 nanometers or more. As used herein, the average size of a nanoparticle refers to its average length, width, height, and/or diameter.

The titanium-containing nanoparticles may have a specific surface area is greater than 150 $m^2/g$, in some embodiments greater than 200 $m^2/g$.

When employed, the nanoparticles may constitute about 0.0001 wt. % or more, such as about 0.001 wt. % or more, such as about 0.01 wt. % or more, such as about 0.1 wt. % or more, such as about 0.2 wt. % or more, such as about 0.5 wt. % or more, such as about 1 wt. % or more to about 20 wt. % or less, such as about 15 wt. % or less, such as about 10 wt. % or less, such as about 5 wt. % or less, such as about 2 wt. % or less, such as about 1 wt. % or less, such as about 0.5 wt. % or less, such as about 0.2 wt. % or less, such as about 0.1 wt. % or less of the coating. Such concentration may be for a coating after curing and/or after tempering.

III. Method

A variety of different techniques may generally be employed to form the coating and in particular the binder comprising the interpenetrating network. In general, a coating formulation comprising a glass frit is applied to a surface of the glass substrate. The coating formulation also contains polymerizable compounds (e.g., monomers, oligomers and/or pre-polymers). The coating formulation may also contain any other optional additives (e.g., pigments, light stabilizers, nanoparticles, etc.).

In general, the coating formulation contains a first polymerizable compound, a second polymerizable compound, and a third polymerizable compound. In one embodiment, the first polymerizable compound comprises a polymerizable polyol. The coating formulation may also contain a crosslinking agent. For instance, the crosslinking agent may be an isocyanate. The crosslinking agent may alternatively be an amine crosslinking agent (e.g., a melamine crosslinking agent and in particular a melamine-formaldehyde crosslinking agent).

Once applied to the substrate, the coating formulation can be cured. Such curing can provide a first crosslinked resin. For instance, when the first polymerizable compound comprises a polymerizable polyol, the first crosslinked resin comprises a crosslinked polyol. In addition, such curing can also provide a second crosslinked resin such that the first crosslinked resin and the second crosslinked resin form an interpenetrating network. Further, the third polymerizable compound may also be polymerized. In one embodiment, such compound may also form a crosslinked resin that forms an interpenetrating network the first crosslinked resin and/or the second crosslinked resin.

In one embodiment, at least one of the resins may be crosslinked before application to a surface of a glass substrate. That is, the coating formulation or composition may contain at least one crosslinked resin in combination with a glass frit. In addition, the coating formulation may contain a second crosslinked resin and/or a third crosslinked resin. Alternatively, the coating formulation or composition may contain a second polymerizable compound and/or a third polymerizable compound. For instance, the coating formulation or composition may contain a second crosslinked resin and a third polymerizable compound. Or, the coating formulation or composition may contain a second polymerizable compound and a third crosslinked resin.

In one embodiment, the interpenetrating network may be formed and then combined with the glass frit and any other components (e.g., pigments, etc.). In this case, the composition containing the interpenetrating network and the resins (e.g., at least first crosslinked polyol resin, second crosslinked resin, and third resin) and the glass frit can be applied to a surface of a glass substrate. Prior to application, the composition may be ground for example using a ball mill.

In addition, the coating formulation may also contain one or more organic solvents. Any solvent capable of dispersing or dissolving the components may be suitable, such as alcohols (e.g., ethanol or methanol); dimethylformamide, dimethyl sulfoxide, hydrocarbons (e.g., pentane, butane, heptane, hexane, toluene and xylene), ethers (e.g., diethyl ether and tetrahydrofuran), ketones and aldehydes (e.g., acetone and methyl ethyl ketone), acids (e.g., acetic acid and formic acid), and halogenated solvents (e.g., dichloromethane and carbon tetrachloride), and so forth. Although the actual concentration of solvents employed will generally depend on the components of the formulation and the substrate on which it is applied, they are nonetheless typically present in an amount from about 1 wt. % to about 40 wt. %, in some embodiments from about 5 wt. % to about 35 wt. %, and in some embodiments, from about 10 wt. % to about 30 wt. % of the formulation (prior to drying).

In addition, the coating formulation may contain any other conventional additives as employed in the art. For instance, such additives may be employed to facilitate dispersion of the components and/or assist in formation of the coating. For instance, the coating formulation may contain an initiator and/or a catalyst, such as an acid catalyst. Examples of such acid catalysts may include, for instance, acetic acid, sulfonic acid, nitric acid, hydrochloric acid, malonic acid, glutaric acid, phosphoric acid, etc., as well as combinations thereof. When employed, initiators and/or acid catalysts typically constitute from about 0.001 wt. % to about 2 wt. %, in some embodiments from about 0.005 wt. % to about 1 wt. %, in some embodiments, from about 0.01 wt. % to about 0.5 wt. % of the formulation, and in some embodiments from about 0.1 wt. % to about 0.25 wt. %.

The coating formulation may contain a surfactant. The surfactant may be an anionic surfactant, a cationic surfactant, and/or a non-ionic surfactant. For instance, in one embodiment, the surfactant may be a non-ionic surfactant. The non-ionic surfactant may be an ethoxylated surfactant, a propoxylated surfactant, an ethoxylated/propoxylated surfactant, polyethylene oxide, an oleate (e.g., sorbitan monooleate, etc.), fatty acid ester or derivative thereof, an alkyl glucoside, a sorbitan alkanoate or a derivative thereof, a combination thereof, etc. When employed, surfactants typically constitute from about 0.001 wt. % to about 2 wt. %, in some embodiments from about 0.005 wt. % to about 1 wt. %, in some embodiments, from about 0.01 wt. % to about 0.5 wt. % of the formulation, and in some embodiments from about 0.1 wt. % to about 0.25 wt. %.

Suitable application techniques for applying the coating formulation to the glass substrate may involve, for example, dip coating, drop coating, bar coating, slot-die coating, curtain coating, roll coating, spray coating, printing, etc. The kinematic viscosity of the formulation may be adjusted based on the particular application employed. Typically, however, the kinematic viscosity of the formulation is about 450 centistokes or less, in some embodiments from about 50 to about 400 centistokes, and in some embodiments, from about 100 to about 300 centistokes, as determined with a Zahn cup (#3), wherein the kinematic viscosity is equal to 11.7(t-7.5), where t is the efflux time (in seconds) measured during the test. If desired, viscosity modifiers (e.g., xylene) can be added to the formulation to achieve the desired viscosity.

Once applied, the coating formulation may be polymerized to form the interpenetrating network. The method of polymerization can be any as generally known in the art. For instance, polymerization may be via UV radiation, heating or a combination thereof. In one embodiment, only heating may be employed. In one embodiment, both UV radiation and heating may be employed to polymerize the various compounds. For instance, UV radiation may be employed to polymerize any acrylate compounds. Meanwhile, heating may be employed to form the crosslinked polyol and polysiloxane. Such heating and UV exposure may be simultaneous. Alternatively, the heating may be conducted first and the UV light may follow. Or, the UV exposure may be first and the heating may follow.

The coating formulation may be heated to polymerize and cure the polymerizable compounds. For example, the coating formulation may be cured at a temperature of from about 50° C. to about 350° C., in some embodiments from about 75° C. to about 325° C., in some embodiments from about 100° C. to about 300° C., in some embodiments from about 150° C. to about 300° C., and in some embodiments, from about 200° C. to about 300° C. for a period of time ranging from about 30 seconds to about 100 minutes, in some embodiments from about 30 seconds to about 50 minutes, in some embodiments from about 1 to about 40 minutes, and in some embodiments, from about 2 to about 15 minutes. Curing may occur in one or multiple steps. If desired, the coating formulation may also be optionally dried prior to curing to remove the solvent from the formulation. Such a pre-drying step may, for instance, occur at a temperature of from about 20° C. to about 150° C., in some embodiments from about 30° C. to about 125° C., and in some embodiments, from about 40° C. to about 100° C.

In addition to heating, as indicated above, other techniques may also be utilized to polymerize the compounds. For instance, with the presence of initiators, a UV light may be employed to polymerize the compounds.

The UV exposure may conducted at an intensity and time period that allows for sufficient polymerization depending on the types of monomers. For instance, for certain acrylates, UV exposure at an intensity of about 15 mW/cm$^2$ or more, such as about 20 mW/cm$^2$ or more, such as about 25 mW/cm$^2$ or more, such as about 30 mW/cm$^2$ or more for a period of time ranging from about 30 seconds to about 100 minutes, in some embodiments from about 30 seconds to about 50 minutes, in some embodiments from about 1 to about 25 minutes, and in some embodiments, from about 1 to about 10 minutes should be sufficient. In one embodiment, the UV exposure may be from 25 to 30 mW/cm$^2$ for a period of 5 minutes. In addition, UV exposure may be conducted in an inert atmosphere. For instance, the exposure may be conducted in the presence of argon gas or nitrogen gas. In one particular embodiment, the UV exposure is conducted in the presence of nitrogen gas.

If desired, the glass article may also be subjected to an additional heat treatment (e.g., tempering, heat bending, etc.) to further improve the properties of the article. The heat treatment may, for instance, occur at a temperature of from about 500° C. to about 800° C., and in some embodiments, from about 550° C. to about 750° C. The glass article may also undergo a high-pressure cooling procedure called "quenching." During this process, high-pressure air blasts the surface of the glass article from an array of nozzles in varying positions. Quenching cools the outer surfaces of the glass much more quickly than the center. As the center of the glass cools, it tries to pull back from the outer surfaces. As a result, the center remains in tension, and the outer surfaces go into compression, which gives tempered glass its strength.

In certain embodiments, it may also be desirable to control coating so that the organic material (e.g., organic binders) is relatively low. Among other things, minimizing the degree of organic material can accelerate any subsequent heating steps (e.g., tempering). For example, the cured coating may contain organic material in an amount of about 1 wt. % or more, such as about 2 wt. % or more, such as about 3 wt. % or more, such as about 5 wt. % or more to about 12 wt. % or less, such as about 11 wt. % or less, such as about 10 wt. % or less of the coating, such as about 9 wt. % or less, such as about 8 wt. % or less of the coating.

In such embodiments, the combined amount of the glass frit and any optional components (e.g., pigments, metal alkoxides, etc.) in the cured coating is typically about 80 wt. % or more, such as about 85 wt. % or more, such as about 88 wt. % or more, such as about 89 wt. % or more, such as about 90 wt. % or more, such as about 91 wt. % or more, such as about 92 wt. % or more to about 99 wt. % or less, such as about 98 wt. % or less, such as about 97 wt. % or less, such as about 95 wt. % or less.

Of course, in other embodiments, it may be desirable to employ a relatively high organic material content in the coating, such as more than 12 wt. %, such as about 13 wt. % or more, such as about 14 wt. % or more to about 25 wt. % or less, such as about 20 wt. % or less, such as about 18 wt. % or less. In such embodiments, the binder resins may likewise be present in an amount of more than 12 wt. %, such as about 13 wt. % or more, such as about 14 wt. % or more to about 25 wt. % or less, such as about 20 wt. % or less, such as about 18 wt. % or less. The combined amount of the glass frit and any optional components (e.g., pigments, metal alkoxides, etc.) may be present in an about 75 wt. % or more, such as about 80 wt. % or more, such as about 82 wt. % or more to about 88 wt. % or less, such as about 87 wt. % or less, such as about 86 wt. % or less.

The cured and/or tempered coating may have a thickness of about 1 micron or more, such as about 5 microns or more, such as about 10 microns or more, such as about 15 microns or more to about 250 microns or less, such as about 150 microns or less, such as about 100 microns or less, such as about 75 microns or less, such as about 60 microns or less, such as about 50 microns or less. The present inventors have discovered that they can provide thinner coatings with the present binder and comparable or even better properties in comparison to coatings containing only one or two binders. However, it should be understood that the thickness of the coating is not necessarily limited by the present invention.

In addition, the coating may be a translucent coating in one embodiment. In another embodiment, the coating may have a tint. For instance, the coating may have a white color or tint. Alternatively, the coating may have a black color or tint.

The present invention may be better understood with reference to the following examples.

EXAMPLES

Test Methods

Coating Thickness:

The coated layer of as coated glass is removed by a razor. The step height of the coating is observed using a profilometer. The data is an average measured from three points at different positions.

Roughness:

The topography is investigated by a profilometer in a scanning area of 5,000 microns by 5,000 microns and a scanning speed of 20 microns/second. The force of the stylus on the surface is 5 mg and the scanning number is 30. The surface roughness is quantitatively characterized by measuring the arithmetic average roughness and root mean square roughness.

Cross-Hatch Adhesion:

The cross-hatch adhesion is determined in accordance with ASTM D3359-09. For the test, cuts a certain distance apart are made in the coating depending on the thickness of the coating. Additionally, intersecting cuts are also made. Tape is placed on the grid area and within approximately 90 seconds of application, the tape is removed by pulling it off rapidly at as close to an angle of 180° as possible. The grid area is inspected for removal of coating from the substrate. The classifications go from 0B to 5B wherein 5B indicates that none of the squares of the lattice are detached. A value of less than 3B is indicative of a failure.

Organic Content:

The organic content inside the coating of as coated glass is analyzed by burning powder (0.3-0.5 grams) scratched from as coated glass. The powder is burned at 650° C. for 30 minutes. The percentage of burned organic compound is calculated.

Solvent Resistance:

The ability of a surface to resist solvents can be determined in accordance with ASTM D5402-15 using a MEK (methyl ethyl ketone) solvent. More particularly, the surface is rubbed with a cloth 300 times using a cloth containing the MEK solvent. A value of less than 100 is indicative of a failure.

Hoffman Hardness:

The mechanical strength of as coated glass is evaluated by Hoffman hardness using a BYK Gardner tester with a weight rider of 10 g. A value of less than 10 is indicative of a failure. The test can be performed in accordance with GE E50TF61.

Stud Pull Strength:

The adhesive strength of the coating can be evaluated by measuring the stud pull strength. The coating surface is blown with nitrogen gas. An aluminum dolly with a diameter of 20 mm is polished by sand paper (100#). An aldehyde-amine condensate/organocopper compound mixture (Loctite 736) is sprayed on the surface of the coating and an aluminum stud. After 5 minutes, an acrylic adhesive (312) s added to the surface of the aluminum stud and it is glued to the surface of the coating with pressure until solid adhesion is achieved. The glued aluminum stud and glass are placed at room temperature for 3 hours. The dolly is pulled by a PosiTest AT with a pull rate of 30 psi/sec. The adhesive strength is measured by the PosiTest AT. A strength of less than 450 psi is considered a failure.

Corrosion Resistance:

The ability of a surface to resist corrosion can be determined in accordance with ASTM B368-09 (2014), which is known as the Copper-Accelerated Acetic Acid-Salt Spray (Fog) Testing ("CASS" Test). During this test, samples are subjected to a salt fog containing laden copper ions and then examined for color change after 120 hours of exposure using the method described above. The solution used contained 0.94 grams of $CuCl_2$, 4.6 grams of acetic acid, and 258 grams of NaCl.

Color Change:

The color change of a surface may be determined using values known as "$\Delta E$" and "$\Delta C$", which are well understood in the art and can be determined in accordance with ASTM 2244-16. $\Delta E$ may, for instance, correspond to the CIE LAB Scale L*, a*, b*, wherein L* is (CIE 1976) lightness units; a* is (CIE 1976) red-green units; b* is (CIE 1976) yellow-blue units. For this scale, the distance between $L^*_o$ $a^*_o b^*_o$ and $L^*_1 a^*_1 b^*_1$ is: $\Delta E=[(\Delta L^*)^2+(\Delta a^*)^2+(\Delta b^*)^2]^{1/2}$, where $\Delta L^* = L^*_1 - L^*_o$; $\Delta a^* = a^*_1 - a^*_o$; $\Delta b^* = b^*_1 - b^*_o$; the subscript "$_o$" represents the initial color of the article and the subscript "$_1$" represents the color of the article after a change in conditions (e.g., CASS testing); and the numbers employed (e.g., a*, b*, L*) are those calculated by the aforesaid (CIE LAB 1976) L*, a*, b* coordinate technique. Also, $\Delta C = [(\Delta a^*)^2 + (\Delta b^*)^2]^{1/2}$. When the coating-side $\Delta E$ or $\Delta C$ values are measured, then coating side a*, b* and L* values are used. Likewise, when glass side $\Delta E$ or $\Delta C$ values are measured, glass side a*, b* and L* values are used.

Jetness:

The jetness of the coating is evaluated using optical data, L*, a*, and b* values. The jetness is calculated using the following equation: Jetness=100[log(92.96/(X10/D65))+log(98.23/(Y10/D65))−log(106.28/(Z10/D65))]. The X10/D65, Y10/D65, and Z10/D65 values are data measured by the Hunter optical instrument and indicates the color change of a sample at the X, Y, and Z axis when incident light is 10 degrees and lamination light is daylight. Jetness is generally measured for tempered glass.

Condenser Chamber Test:

The color change of a surface can be determined by conducting a condenser chamber test. The glass article is placed in a chamber at 45° C. at 100% humidity for 21 days. L*, a*, and b* values are measured before and after the test.

Water Contact Angle:

The water contact angle may be measured with a contact angle instrument (FTA 135) at room temperature. One sessile drop of deionized water (approximately 2.3 microliters) is wetted on the surface and the contact angle is immediately measured. The data is the average of three points on the glass. The calculation of the contact angle is performed by software.

Example 1

Coatings containing a binder containing an interpenetrating network were compared against coatings containing other binders. A coating formulation containing glass frit, an inorganic pigment, and a respective binder was applied to one surface of a glass substrate. The method of making the coating is provided below.

The glass frits employed in the samples are summarized in the table below.

|  | Frit 1 (wt. %) | Frit 2 (wt. %) |
| --- | --- | --- |
| Chromium oxide | — | 17.92 |
| Cobalt oxide | — | — |
| Boron oxide | 5.2 | — |
| Zinc oxide | 2.0-15 | 3.174 |
| Aluminum oxide | 1-10 | — |
| Bismuth oxide | 70-90 | 31.99 |
| Quartz | 1-10 | — |
| Pigment | 1-10 | — |
| Barium oxide | — | — |
| Silicon oxide | — | 17.01 |
| Thorium dioxide | — | 13.72 |
| Copper(II) oxide | — | 9.097 |
| Titanium dioxide | — | 2.802 |
| Sodium oxide | — | 1.36 |
| Potassium oxide | — | 0.448 |
| Strontium oxide | — | 0.4526 |

Pigment slurry: The pigment slurry is prepared by combining 0.7 grams of PEG1900, 10 mL of xylene and 10 mL of butanol. Then 40 grams of black pigment (V-7709) is added and the slurry is dispersed for 5 minutes at room temperature. The slurry is mixed I one ball mill for 3 days.

Polymer binders: The binder consists of three parts: (a) a crosslinked polyol resin (i.e., a melamine-polyol resin), (b) a silane resin, and (c) an epoxy acrylate resin (first binder) or an aliphatic acrylate (second binder). A first binder is prepared by first combining melamine-formaldehyde, an epoxy acrylate oligomer, an ethoxylated trimethlolpropane triacrylate, and a polyether polyol. A second binder is prepared by first combining melamine-formaldehyde, an aliphatic acrylate, an ethoxylated trimethlolpropane triacrylate, and a polyether polyol. Then, xylene and butanol are added separately to each formulation. Then, p-toluenesulfonic acid and the silane formulation are added to each formulation. The formulations are mixed for 1 hour at room temperature.

The silane formulation is prepared by separately combining 22.1 grams of n-propanol, 12.66 grams of normal butyl alcohol, 3.41 grams of deionized water. Then, 22.83 grams of glycidoxypropyltrimethoxysilane, 0.67 grams of phenyltriethoxysilane, 0.67 grams of hexyltrimethoxysilane, and 1.33 grams of tetraethoxysilane are added. Then, 21.33 grams of a 15% elongated silica nanoparticle colloidal dispersion in isopropanol is added and the formulation is immediately mixed after 0.4 grams of acetic acid is added. The formulation is further stirred at room temperature for 24 hours.

The coating is prepared by combining glass frit with pigment slurry and the binder. It is then ground by ball mill and five cubic aluminum type of grading media is used. The ball mill time is at least 3 days.

Then, glass with dimensions of 8 inches by 12 inches and a thickness of 4 mm was washed by 1% $CeO_2$ solution and rinsed by tap water. Then the glass was washed by soap and rinsed by deionized water. The glass was dried with nitrogen gas. The cleaned glass is placed on a coating machine with a bird bar having a size of 3 mil and 6.5 inches wide. The coating speed was 100 mm/sec. The coated glass was moved to the oven with a temperature setting of 260° C. for 24 minutes to generate "as coated" glass. Then, the glass was heated in the oven at a temperature of 680° C. for 14 minutes to develop tempered glass.

The samples containing a binder with an epoxy acrylate oligomer are summarized below.

|  | Sample 1 | Sample 2 | Sample 3 | Sample 4 | Sample 5 | Sample 6 |
| --- | --- | --- | --- | --- | --- | --- |
| Melamine-formaldehyde (g) | 10 | 10 | 10 | 5 | 5 | 5 |
| Epoxy acrylate oligomer (g) | 10 | 10 | 10 | 17.5 | 17.5 | 17.5 |
| Polyether polyol (g) | 5 | 5 | 5 | 2.5 | 2.5 | 2.5 |
| p-toluenesulfonic acid (g) | 0.1 | 0.1 | 0.1 | 0.1 | 0.1 | 0.1 |
| Xylene (mL) | 5 | 5 | 5 | 5 | 5 | 5 |

-continued

|  | | | | | | |
|---|---|---|---|---|---|---|
| Butanol (mL) | 5 | 5 | 5 | 5 | 5 | 5 |
| Ethoxylated trimethlolpropane triacrylate (g) | 2 | 2 | 2 | 2 | 2 | 2 |
| Silane Formulation | 37.1 | 37.1 | 37.1 | 37.1 | 37.1 | 37.1 |
| Silanes (g) | 12.45 | 12.45 | 12.45 | 12.45 | 12.45 | 12.45 |
| Total binder (g) | 39.45 | 39.45 | 39.45 | 39.45 | 39.45 | 39.45 |
| Melamine-polyol (%) | 38.02 | 38.02 | 38.02 | 19.01 | 19.01 | 19.01 |
| Polyacrylate (%) | 30.41 | 30.41 | 30.41 | 49.42 | 49.42 | 49.42 |
| Silanes (%) | 31.57 | 31.57 | 31.57 | 31.57 | 31.57 | 31.57 |
| Glass Frit 1 (g) | 15.7 | 15.7 | 15.7 | 15.7 | 15.7 | 15.7 |
| Glass Frit 2 (g) | 0.3 | 0.3 | 0.3 | 0.3 | 0.3 | 0.3 |
| Pigment (g) | 5 | 5 | 5 | 5 | 5 | 5 |
| Binder (g) | 3 | 4 | 5 | 3 | 4 | 5 |
| Thermal initiator (mL) (0.25 g benzoyl peroxide in 10 mL xylene) | 0.2 | 0.2 | 0.2 | 0.2 | 0.2 | 0.2 |
| PEG1900 (g) | 0.25 | 0.25 | 0.25 | 0.25 | 0.25 | 0.25 |
| Total | 24.45 | 25.45 | 26.45 | 24.45 | 25.45 | 26.45 |
| Pigment (g) | 3.5 | 3.5 | 3.5 | 3.5 | 3.5 | 3.5 |
| Binder (g) | 1.59 | 2.12 | 2.65 | 1.59 | 2.12 | 2.65 |
| Frit (g) | 16 | 16 | 16 | 16 | 16 | 16 |
| Pigment (%) | 14.31 | 13.75 | 13.23 | 14.31 | 13.75 | 13.23 |
| Binder (%) | 6.50 | 8.33 | 10.02 | 6.50 | 8.33 | 10.02 |
| Frit (%) | 65.44 | 62.87 | 60.49 | 65.44 | 62.87 | 60.49 |
| Org. % | 6.04 | 8.67 | 8.13 | 5.87 | 7.33 | 8.21 |
| Stud Pull (psi) | 1238 | 872 | 1000 | 542 | 732 | 778 |
| Cross-Hatch (B) | 3 | 5 | 5 | 5 | 5 | 4 |
| Hoffman, 10 g | 8 | 10 | 10 | 6 | 8 | 11 |
| MEK Rub Test | >100 | >100 | >100 | 70 | 85 | >100 |
| Jetness | 257 | 264 | 265 | 268 | 262 | 244 |
| CASS Test | | | | | | |
| ΔE | 0.34 | 1.46 | 19.99 | 1.39 | 1.21 | 1.07 |
| ΔC | 0.34 | 1.08 | 2.03 | 1.37 | 0.79 | 0.56 |
| Cross-Hatch (B) | 4 | 0 | 0 | 4 | 4 | 5 |

|  | Sample 7 | Sample 8 | Sample 9 | Sample 10 | Sample 11 | Sample 12 |
|---|---|---|---|---|---|---|
| Melamine-formaldehyde (g) | 2.5 | 2.5 | 2.5 | 0 | 0 | 0 |
| Epoxy acrylate oligomer (g) | 21.25 | 21.25 | 21.25 | 25 | 25 | 25 |
| Polyether polyol (g) | 1.25 | 1.25 | 1.25 | 0 | 0 | 0 |
| p-toluenesulfonic acid (g) | 0.1 | 0.1 | 0.1 | 0 | 0 | 0 |
| Xylene (mL) | 5 | 5 | 5 | 5 | 5 | 5 |
| Butanol (mL) | 5 | 5 | 5 | 5 | 5 | 5 |
| Ethoxylated trimethlolpropane triacrylate (g) | 2 | 2 | 2 | 2 | 2 | 2 |
| Silane Formulation | 37.1 | 37.1 | 37.1 | 37 | 37 | 37 |
| Silanes (g) | 12.45 | 12.45 | 12.45 | 12.42 | 12.42 | 12.42 |
| Total binder (g) | 39.45 | 39.45 | 39.45 | 39.42 | 39.42 | 39.42 |
| Melamine-polyol (%) | 9.50 | 9.50 | 9.50 | 0 | 0 | 0 |
| Polyacrylate (%) | 58.93 | 58.93 | 58.93 | 68.49 | 68.49 | 68.49 |
| Silanes (%) | 31.57 | 31.57 | 31.57 | 31.51 | 31.51 | 31.51 |
| Glass Frit 1 (g) | 15.7 | 15.7 | 15.7 | 15.7 | 15.7 | 15.7 |
| Glass Frit 2 (g) | 0.3 | 0.3 | 0.3 | 0.3 | 0.3 | 0.3 |
| Pigment (g) | 5 | 5 | 5 | 5 | 5 | 5 |
| Binder (g) | 3 | 4 | 5 | 3 | 4 | 5 |
| Thermal initiator (mL) (0.25 g benzoyl peroxide in 10 mL xylene) | 0.2 | 0.2 | 0.2 | 0.2 | 0.2 | 0.2 |
| PEG1900 (g) | 0.25 | 0.25 | 0.25 | 0.25 | 0.25 | 0.25 |
| Total | 24.45 | 25.45 | 26.45 | 24.45 | 25.45 | 26.45 |
| Pigment (g) | 3.5 | 3.5 | 3.5 | 3.5 | 3.5 | 3.5 |
| Binder (g) | 1.59 | 2.12 | 2.65 | 1.59 | 2.12 | 2.65 |
| Frit (g) | 16 | 16 | 16 | 16 | 16 | 16 |
| Pigment (%) | 14.31 | 13.75 | 13.23 | 14.31 | 13.75 | 13.23 |
| Binder (%) | 6.50 | 8.33 | 10.02 | 6.50 | 8.33 | 10.02 |
| Frit (%) | 65.44 | 62.87 | 60.49 | 65.44 | 62.87 | 60.49 |
| Org. % | 5.03 | 6.78 | 7.52 | 5.45 | 7.15 | 7.93 |
| Stud Pull (psi) | 960 | 778 | 808 | 581 | 885 | 1037 |
| Cross-Hatch (B) | 4 | 5 | 5 | 5 | 5 | 5 |
| Hoffman, 10 g | 8 | 10 | 12 | 8 | 9 | 11 |
| MEK Rub Test | 30 | >100 | >100 | 30 | 50 | 80 |

|  |  |  |  |  |  |  |
|---|---|---|---|---|---|---|
| Jetness | 275 | 257 | 249 | 277 | 241 | 251 |
| ΔE | 0.50 | 0.58 | 0.97 | 1.57 | 1.86 | 1.83 |
| ΔC | 0.17 | 0.40 | 0.47 | 0.90 | 1.02 | 1.38 |
| Cross-Hatch (B) | 3 | 5 | 5 | 2 | 3 | 3 |

In general, without the polyol resin, the CASS and MEK tests indicated sample failures. This may indicate that the polyol resin may play the function of improving compatibility between the various networks.

Samples containing a binder with an epoxy acrylate were also tested to study the effect of curing temperature on the coatings. These samples and results are summarized below.

|  | Sample 13 | Sample 14 | Sample 15 | Sample 16 | Sample 17 | Sample 18 | Sample 19 | Sample 20 | Sample 21 |
|---|---|---|---|---|---|---|---|---|---|
| Sample | 3 | 3 | 3 | 6 | 6 | 6 | 9 | 9 | 9 |
| Curing Temperature (° C.) | 240 | 250 | 260 | 250 | 260 | 270 | 250 | 260 | 270 |
| Stud Pull (psi) | 644 | 100 | 1121 | 778 | 1023.5 | 872.5 | 808 | 1023.5 | 929 |
| Cross-Hatch (B) | 5 | 5 | 5 | 4 | 5 | 5 | 5 | 5 | 5 |
| Hoffman, 10 g | 9 | 10 | 10 | 11 | — | — | 12 | 11 | 12 |
| MEK Rub Test | >100 | >100 | >100 | >100 | >100 | >100 | >100 | >100 | >100 |
| Jetness | 253 | 265 | 266 | 244 | 247 | 234 | 249 | 228 | 228 |

In general, there are minimal impacts on the Cross-Hatch, Hoffman, and MEK rub tests as a function of curing temperature. Meanwhile, there are some variations on the stud pull test. Nevertheless, the enhancement on the chemical, adhesive, and chemical resistance may be due to the epoxy resin.

The samples containing a binder with an aliphatic acrylate are summarized below.

|  | Sample 22 | Sample 23 | Sample 24 | Sample 25 | Sample 26 | Sample 27 |
|---|---|---|---|---|---|---|
| Melamine-formaldehyde (g) | 10 | 10 | 10 | 10 | 10 | 10 |
| Aliphatic acrylate (g) | 10 | 10 | 10 | 10 | 10 | 10 |
| Polyether polyol (g) | 5 | 5 | 5 | 5 | 5 | 5 |
| p-toluenesulfonic acid (g) | 0.1 | 0.1 | 0.1 | 0.1 | 0.1 | 0.1 |
| Xylene (mL) | 5 | 5 | 5 | 5 | 5 | 5 |
| Butanol (mL) | 5 | 5 | 5 | 5 | 5 | 5 |
| Ethoxylated trimethlolpropane triacrylate (g) | 2 | 2 | 2 | 2 | 2 | 2 |
| Silane Formulation (g) | 7.4 | 7.4 | 7.4 | 7.4 | 7.4 | 7.4 |
| Glass Frit 1 (g) | 15.7 | 15.7 | 15.7 | — | — | — |
| Glass Frit 2 (g) | 0.3 | 0.3 | 0.3 | — | — | — |
| Ferro Glass Frit (g) | — | — | — | 16 | 16 | 16 |
| Pigment (g) | 5 | 5 | 5 | 5 | 5 | 5 |
| Binder (g) | 4 | 5 | 6 | 4 | 5 | 6 |
| PEG1900 (g) | 0.25 | 0.25 | 0.25 | 0.25 | 0.25 | 0.25 |
| Thermal initiator (mL) (0.25 g benzoyl peroxide in 10 mL xylene) | 0.6 | 0.6 | 0.6 | 0.6 | 0.6 | 0.6 |
| Total | 25.85 | 26 | 27 | 25 | 26 | 27 |
| Pigment (g) | 3.5 | 3.5 | 3.5 | 3.5 | 3.5 | 3.5 |
| Binder (g) | 3.2 | 4 | 4.8 | 3.2 | 4 | 4.8 |
| Frit (g) | 16 | 16 | 16 | 16 | 16 | 16 |
| Pigment (%) | 14 | 14 | 14 | 14 | 14 | 14 |
| Binder (%) | 12.8 | 16 | 19.2 | 12.8 | 16 | 19.2 |
| Frit (%) | 64 | 64 | 64 | 64 | 64 | 64 |
| Org. % | 7.2 | 7.67 | 9.12 | — | — | — |
| Thickness (μm) | 25 | 22.34 | 22.15 | — | — | — |
| Stud Pull (psi) | 778 | 934 | 630 | — | — | — |
| Cross-Hatch (B) | 5 | 4 | 5 | — | — | — |
| Hoffman, 10 g | 11 | 10 | 12 | — | — | — |

-continued

|  | Sample 22 | Sample 23 | Sample 24 | Sample 25 | Sample 26 | Sample 27 |
|---|---|---|---|---|---|---|
| MEK Rub Test | >100 | >100 | >100 | — | — | — |
| Jetness | 262 | 265 | 248 | — | — | — |
| CASS Test | | | | | | |
| ΔE | 1.71 | 1.43 | 0.83 | — | — | — |
| ΔC | 1.53 | 1.17 | 0.42 | — | — | — |
| Cross-Hatch (B) | 4 | 4 | 4 | — | — | — |

In general, as the percentage of organics inside the coated layer of an "as coated" glass is increased, the better the performance of the "as coated" glass. However, the cost will generally increase as well. The value of stud pull and Hoffman is generally higher than "as coated" glass without an aliphatic acrylate. Such values are generally less than 400 psi and 7, respectively. With the increase in organics, the change of both ΔE and ΔC is diminished which may signify the susceptibility of "as coated" glass to corrosion induced by an acid and moisture environment. Additionally, the water contact angle was approximately 85.3 degrees, which is lower than "as coated" glass without an aliphatic acrylate (approximately 130 degrees). Such indicates a more hydrophilic surface.

Samples containing an aliphatic acrylate were also tested to study the effect of coating thickness. The samples and results are summarized below.

|  | Sample 28 | Sample 28 | Sample 29 |
|---|---|---|---|
| Melamine-formaldehyde (g) | 10 | 10 | 10 |
| Aliphatic acrylate (g) | 10 | 10 | 10 |
| Polyether polyol (g) | 5 | 5 | 5 |
| p-toluenesulfonic acid (g) | 0.1 | 0.1 | 0.1 |
| Xylene (mL) | 5 | 5 | 5 |
| Butanol (mL) | 5 | 5 | 5 |
| Ethoxylated trimethlolpropane triacrylate (g) | 2 | 2 | 2 |
| Silane Formulation (g) | 7.4 | 7.4 | 7.4 |
| Glass Frit 1 (g) | — | — | — |
| Glass Frit 2 (g) | — | — | — |
| Ferro Glass Frit (g) | 16 | 16 | 16 |
| Pigment (g) | 5 | 5 | 5 |
| Binder (g) | 5 | 5 | 5 |

-continued

|  | Sample 28 | Sample 28 | Sample 29 |
|---|---|---|---|
| PEG1900 (g) | 0.25 | 0.25 | 0.25 |
| Thermal initiator (mL) (0.25 g benzoyl peroxide in 10 mL xylene) | 0.6 | 0.6 | 0.6 |
| Total | 26 | 26 | 26 |
| Pigment (g) | 3.5 | 3.5 | 3.5 |
| Binder (g) | 4 | 4 | 4 |
| Frit (g) | 16 | 16 | 16 |
| Pigment (%) | 14 | 14 | 14 |
| Binder (%) | 16 | 16 | 16 |
| Frit (%) | 64 | 64 | 64 |
| Org. % | 8.01 | 8.01 | 8.01 |
| Thickness (μm) | 23.16 | 46.03 | 65 |
| Stud Pull (psi) | 341 | 508 | 667 |
| Cross-Hatch (B) | 5 | 5 | 5 |
| Hoffman, 10 g | 7 | 12 | 20 |
| MEK Rub Test | 70 | >100 | >100 |
| Jetness | 245 | 242 | 243 |

The increase in the mechanical and adhesive strength with the increase in thickness may be attributed to the thicker coated layer which can prevent or minimize damage from scratch during the Hoffman hardness test and may enhance the coherent binding energy of the coated layer with the glass surface. In addition, although the thickness is changed, the pigment amount and dispersion appears to remain the same as evidenced by the Jetness. Also, a thicker coated layer provides more resistance to dissolubility of a polymer binder by a chemical solvent as evidenced by the MEK results.

Additionally, several comparative samples 1 and 2 were prepared. Comparative samples 1-2 included a binder containing an acrylonitrile-styrene-acrylate copolymer. Comparative samples 3-6 included a binder containing (a) a crosslinked polyol resin (i.e., a melamine-polyol resin) and (b) a silane resin. The silane resin was made from glycidoxypropyltrimethoxysilane, phenyltriethoxysilane hexyltrimethoxysilane, and 1 tetraethoxysilane. The coatings were cured in an oven at 240° C. for 15 minutes.

The samples were tested and the results are shown below.

|  | Comp. Sample 1 | Comp. Sample 2 | Comp. Sample 3 | Comp. Sample 4 | Comp. Sample 5 | Comp. Sample 6 |
|---|---|---|---|---|---|---|
| Org. % | 9.27 | 11.57 | 8.34 | 8.18 | 12.18 | 13.91 |
| Thickness (μm) | 34.5 | 63.18 | 19.66 | 36.66 | 16.37 | 45.18 |
| Surface of tempered glass | smooth | smooth | smooth | smooth | smooth | rough |
| Cross-Hatch (B) | 3B | 2B-3B | 4B-5B | 4B | 3B | 4B |
| Stud Pull (psi) | 229 | 526 | 369 | 308 | 374 | 405 |

|  | Comp. Sample 1 | Comp. Sample 2 | Comp. Sample 3 | Comp. Sample 4 | Comp. Sample 5 | Comp. Sample 6 |
|---|---|---|---|---|---|---|
| Hoffman, 10 g | 5 | 16 | 5 | 7 | 5 | 15 |
| MEK Rub Test | 30 | 49 | 35 | 54 | 24 | 99 |
| CASS Test | | | | | | |
| ΔE | — | 0.8 | 1.29 | 0.48 | 4.53 | 16.58 |
| ΔC | — | 0.75 | 0.36 | 0.17 | 0.43 | 0.98 |
| Cross-Hatch (B) | — | Fail | 4B | 3B | 3B | Fail |

In general, "as coated" glass articles with a binder containing an interpenetrating network exhibited excellent mechanical strength, adhesive strength, and chemical stability. A significant improvement in chemical resistance was observed as demonstrated by the MEK rub test. A significant improvement in the stud pull strength test was also observed.

Example 2

A coating formulation containing glass frit, a binder containing an interpenetrating network, and a fluorescent pigment (UVL-200R QCR Solutions Corp.) was applied to one surface of a glass plate using a bird type applicator. The coating was cured in an oven at a temperature of 260° C. for 24 minutes, and the coated glass plate was thereafter subjected to a heat treatment at a temperature of 680° C. for 14 minutes.

The samples were tested and the results are shown below.

|  | Sample 30 | Sample 31 | Sample 32 |
|---|---|---|---|
| "As Coated" Glass | | | |
| Fluorescent Pigment (wt. %) | 2.48 | 7.08 | 13.22 |
| Org. % | 9.04 | 9.03 | 8.88 |
| Thickness (μm) | 55.67 | 50.44 | 49.01 |
| Stud Pull (psi) | 888.5 | 1090.5 | 1283 |
| Cross-Hatch (B) | 3B | 3B | 3B |
| Hoffman, 10 g | 15 | 17 | 17 |
| MEK Rub Test | >100 | >100 | >100 |
| Condenser Chamber Test | | | |
| ΔE | 3.35 | 3.01 | 3.51 |
| ΔC | 1.43 | 1.63 | 1.41 |
| Cross-Hatch (B) | 3B | 3B | 3B |
| Hoffman, 10 g | 11 | 13 | 11 |

Example 3

A coating formulation containing glass frit, a binder containing an interpenetrating network, and aluminum tri-sec butoxide was applied to one surface of a glass plate. The method of making the coating is provided below.

Aluminum tri-sec butoxide sol: The sol was prepared by combining 8 grams of aluminum tri-sec butoxide to 150 mL of n-propanol. Then, 3 mL of nitric acid (70%) was added and the formulation was stirred at room temperature for 3 days.

Polymer binder: The binder consists of three parts: (a) a crosslinked polyol resin (i.e., a melamine-polyol resin), (b) a silane resin, and (c) an epoxy acrylate resin. The binder is prepared by first combining 2.5 grams of melamine-formaldehyde, 21.25 grams of an epoxy acrylate oligomer, 2 grams of an ethoxylated trimethlolpropane triacrylate, and 5 grams of a polyether polyol. Then, 5 mL of xylene and 5 mL of butanol are added separately. Then, 0.2 grams of p-toluenesulfonic acid and 37.1 grams of the silane formulation are added. The formulation is mixed for 1 hour at room temperature.

The silane formulation is prepared by separately combining 22.1 grams of n-propanol, 12.66 grams of normal butyl alcohol, 3.41 grams of deionized water. Then, 22.83 grams of glycidoxypropyltrimethoxysilane, 0.67 grams of phenyltriethoxysilane, 0.67 grams of hexyltrimethoxylsilane, and 1.33 grams of tetraethoxysilane are added. Then, 21.33 grams of a 15% elongated silica nanoparticle colloidal dispersion in isopropanol is added and the formulation is immediately mixed after 0.4 grams of acetic acid is added. The formulation is further stirred at room temperature for 24 hours.

Then, the formulations containing the epoxy and melamine-formaldehyde resin, silanes, and aluminum tri-sec butoxide are mixed as follows:

|  | Sample 33 | Sample 34 | Sample 35 |
|---|---|---|---|
| Al(s-OBu)$_3$ sol (mL) | 1 | 2 | 4 |
| Silane sol (mL) | 19 | 18 | 16 |
| Epoxy and melamine resin (mL) | 20 | 20 | 20 |
| Total (mL) | 40 | 40 | 40 |
| Al(s-OBu) 3% (g) | 0.15 | 0.3 | 0.6 |

To make the coating, 48 grams of glass frit is combined with 15 grams of a pigment slurry. Then, 18 grams of the binder with aluminum tri-sec butoxide, 0.6 grams of initiator solution (0.25 grams of benzoyl peroxide in 10 mL of xylene), and 0.75 grams of PEG1900 is added. Grinding was done using a ball mill and five cubic aluminum types of grading media were used (US Stonewarn Brun 050-90) and the ball mill time was at least 3 days. The respective amounts of the formulations are as follows:

|  | Sample 33 | Sample 34 | Sample 35 |
|---|---|---|---|
| Glass Frit (g) | 48 | 48 | 48 |
| Black pigment slurry (g) | 15 | 15 | 15 |
| Binder (g) | 18 | 18 | 18 |
| Initiator (g) | 0.6 | 0.6 | 0.6 |
| PEG1900 (g) | 0.75 | 0.75 | 0.75 |
| Al(s-OBu) 3% (g) | 0.033 | 0.066 | 0.131 |

Then, glass with dimensions of 8 inches by 12 inches and a thickness of 4 mm was washed by 1% CeO$_2$ solution and rinsed by tap water. Then the glass was washed by soap and rinsed by deionized water. The glass was dried with nitrogen gas. The cleaned glass is placed on a coating machine with a bird bar having a size of 3 mil and 6.5 inches wide. The coating speed was 100 mm/sec. The coated glass was moved to the oven with a temperature setting of 260° C. for 24 minutes to generate "as coated" glass. Then, the glass was heated in the oven at a temperature of 680° C. for 14 minutes to develop tempered glass.

The samples were tested and the results are shown below.

|  | Sample 33 | Sample 34 | Sample 35 |
|---|---|---|---|
| "As Coated" Glass | | | |
| Thickness (μm) | 68.47 | 59.25 | 57.07 |
| Stud Pull (psi) | 644.5 | 550 | 572 |
| Cross-Hatch (B) | 4B | 4B | 4B |
| Hoffman, 10 g | 16 | 19 | 19 |
| MEK Rub Test | >100 | >100 | >100 |
| CASS Test | | | |
| ΔE | 0.65 | 0.73 | 0.45 |
| ΔC | 0.44 | 0.32 | 0.17 |
| Cross-Hatch (B) | 4B | 5B | 4B |
| Condenser Chamber Test | | | |
| ΔE | 1.37 | 1.19 | 2.50 |
| ΔC | 0.55 | 0.57 | 0.77 |
| Cross-Hatch (B) | 4B | 4B | 4B |

Example 4

A coating formulation containing glass frit, a binder containing an interpenetrating network, and inorganic pigments was applied to one surface of a glass plate. The method of making the coating is provided below.

Pigment slurry: Respective pigment slurries are prepared by adding a color pigment and a surfactant, PEG1900, into mixed solvents of xylene and butanol at room temperature. In particular, 0.75 grams of PEG1900 is combined with 15 mL of xylene and 15 mL of butanol. Then, the pigment is added and the slurry is dispersed for 5 minutes at room temperature with a glass bar. It is mixed in one ball mill for 3 days. The following table summarizes the slurries.

The inorganic pigments are summarized in the table below.

|  | Grey | Yellow | Blue | Green | Brown | Pink |
|---|---|---|---|---|---|---|
| White TiO$_2$, DuPont R706 | 30 | — | — | — | — | — |
| Black pigment, Ferro V-7900 | 10 | — | — | — | — | — |
| Yellow pigment, Mason 7453 | — | 80 | — | — | — | — |
| Blue pigment, Mason 7358 | — | — | 40 | — | — | — |
| Green pigment, Mason 7226 | — | — | — | 40 | — | — |
| Brown pigment, Mason 7424 | — | — | — | — | 40 | — |
| Red stain, 6021 | — | — | — | — | — | 120 |
| Xylene (ml) | 10 | 15 | 13 | 15 | 15 | 15 |
| Butanol (ml) | 10 | 15 | 13 | 15 | 15 | 15 |
| PEG 1900 (g) | 0.75 | 0.75 | 0.75 | 0.75 | 0.75 | 2 |

Polymer binder: The binder consists of three parts: (a) a crosslinked polyol resin (i.e., a melamine-polyol resin), (b) a silane resin, and (c) an epoxy acrylate resin. The binder is prepared by first combining 2.5 grams of melamine-formaldehyde, 21.25 grams of an epoxy acrylate oligomer, 2 grams of an ethoxylated trimethlolpropane triacrylate, and 5 grams of a polyether polyol. Then, 5 mL of xylene and 5 mL of butanol are added separately. Then, 0.2 grams of p-toluenesulfonic acid and 37.1 grams of the silane formulation are added. The formulation is mixed for 1 hour at room temperature.

The silane formulation is prepared by separately combining 22.1 grams of n-propanol, 12.66 grams of normal butyl alcohol, 3.41 grams of deionized water. Then, 22.83 grams of glycidoxypropyltrimethoxysilane, 0.67 grams of phenyltriethoxysilane, 0.67 grams of hexyltrimethoxylsilane, and 1.33 grams of tetraethoxysilane are added. Then, 21.33 grams of a 15% elongated silica nanoparticle colloidal dispersion in isopropanol is added and the formulation is immediately mixed after 0.4 grams of acetic acid is added. The formulation is further stirred at room temperature for 24 hours.

To make the coating, 16 grams of white glass frit is combined with 5 grams of a pigment slurry. Then, 6 grams of the binder, 0.2 grams of initiator solution (0.25 grams of benzoyl peroxide in 10 mL of xylene), and 0.25 grams of PEG1900 is added. Grinding was done using a ball mill and five cubic aluminum types of grading media were used (US Stonewarn Brun 050-90) and the ball mill time was at least 3 days.

Then, glass with dimensions of 8 inches by 12 inches and a thickness of 4 mm was washed by 1% CeO$_2$ solution and rinsed by tap water. Then the glass was washed by soap and rinsed by deionized water. The glass was dried with nitrogen gas. The cleaned glass is placed on a coating machine with a bird bar having a size of 3 mil and 6.5 inches wide. The coating speed was 100 mm/sec. The coated glass was moved to the oven with a temperature setting of 260° C. for 24 minutes to generate "as coated" glass. Then, the glass was heated in the oven at a temperature of 680° C. for 14 minutes to develop tempered glass. Additionally, tempered glass was also prepared by using a belt furnace wherein the speed was 4 inches/minute and the heating condition of the belt furnace is as follows: Zone 1—550° C., Zone 2—650° C., Zone 3—650° C., Zone 6—470° C., Zone 7—375° C., and Zone 8—280° C.

The samples were tested and the results are shown below.

|  | Sample 36 | Sample 37 | Sample 38 | Sample 39 | Sample 40 | Sample 41 |
|---|---|---|---|---|---|---|
| Color | Grey | Yellow | Blue | Green | Brown | Pink |
| "As Coated" Glass | | | | | | |
| Org. % | 7.93 | 10.38 | 8.42 | 10.97 | 8.75 | 7.13 |
| Thickness (μm) | 60.57 | 65.28 | 65.27 | 57.59 | 60.93 | 81.2 |
| Stud Pull (psi) | 422 | 610 | 527 | 589 | 650 | 511 |
| Cross-Hatch (B) | 5 | N/A | 5 | 5 | 5 | N/A |

-continued

|  |  | Sample 36 | Sample 37 | Sample 38 | Sample 39 | Sample 40 | Sample 41 |
|---|---|---|---|---|---|---|---|
| Hoffman, 10 g | | 20 | N/A | 20 | 13 | 19 | 20 |
| MEK Rub Test | | >100 | >100 | >100 | >100 | >100 | >100 |
| CASS Test | | | | | | | |
| ΔE | | 0.71 | N/A | 1.04 | 0.26 | 0.65 | 1.88 |
| ΔC | | 0.36 | N/A | 0.68 | 0.061 | 0.023 | 1.75 |
| Cross-Hatch (B) | | 4B | N/A | 4B | 5B | 5B | 4B |
| Tempered Glass | | | | | | | |
| Color, | L* | 36.98 | 67.9 | 44.24 | 42.65 | 56.73 | 62.78 |
| Blue M | a* | −2.85 | −8.5 | −18.18 | −17.52 | −8.83 | −6.58 |
| (oven) | b* | −5.66 | 24.28 | −22.27 | −1.5 | 36.88 | 2.24 |
| Color, | L* | 51.13 | 67.52 | 53.02 | 43 | 56.68 | 59.98 |
| (belt | a* | −3.06 | −8.01 | −14.35 | −17.38 | 8.83 | −8.2 |
| furnace) | b* | −4.3 | 23.55 | −19.1 | −1.3 | 36.68 | 2.68 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method of forming a glass article containing a glass substrate and a coating, the method comprising:
   applying a coating formulation comprising glass frit, a polymerizable polyol, a crosslinking agent, a second polymerizable compound comprising an organoalkoxysilane compound, and a third polymerizable compound to a surface of the glass substrate,
   curing the coating formulation on the glass substrate wherein at least the polymerizable polyol forms a polyol resin.

2. The method according to claim 1, wherein the organoalkoxysilane compound comprises tetraethoxysilane.

3. The method according to claim 1, wherein the crosslinking agent comprises a melamine crosslinking agent.

4. The method according to claim 1, wherein the third polymerizable compound comprises a compound containing at least two epoxide groups.

5. The method according to claim 1, wherein the third polymerizable compound comprises an acrylate monomer.

6. The method according to claim 1, wherein the third polymerizable compound forms a third resin comprising a crosslinked epoxy resin.

7. The method according to claim 1, wherein the third polymerizable compound forms a third resin comprising a crosslinked acrylate resin.

8. The method according to claim 1, wherein the polyol resin is a crosslinked polyol resin crosslinked with a melamine crosslinking agent.

9. The method according to claim 1, wherein the second polymerizable compound forms a silicon-containing resin comprising a polysilsequioxane.

10. The method according to claim 1, wherein the curing step results in a crosslinked polyol resin, a second crosslinked resin formed from the second polymerizable compound, and a third resin formed from the third polymerizable compound, wherein the resins form an interpenetrating network having a glass transition temperature between the glass transition temperature of any two of the crosslinked polyol resin, the second crosslinked resin, and the third resin.

11. The method according to claim 10, wherein the glass transition temperature of the interpenetrating network is within a range of from 30° C. to 180° C.

12. The method according to claim 1, wherein the coating includes organic material in an amount of 1 wt. % to 25 wt. %.

13. The method according to claim 1, wherein the coating further comprises an inorganic pigment, a fluorescent pigment, or a combination thereof.

14. The method according to claim 1, wherein the coating further comprises a UV absorber, a hindered amine light stabilizer, or a combination thereof.

15. The method according to claim 1, wherein the glass frit comprises a colored glass frit.

16. The method according to claim 1, wherein the coating further comprises a silicon-containing nanoparticle.

17. The method according to claim 1, wherein the coating exhibits a cross-hatch adhesion of 3B or higher in accordance with ASTM D3359-09.

18. The method according to claim 1, wherein the coating exhibits an MEK rub resistance of 100 strokes or greater in accordance with ASTM D5402-15.

19. The method according to claim 1, wherein the coating exhibits a Hoffman hardness of 10 or greater in accordance with GE E50TF61.

20. The method according to claim 1, wherein the coating exhibits a stud pull strength of 450 pounds per square inch or greater.

21. The method according to claim 1, wherein the coating exhibits a ΔE value of about 2 or less after being exposed to a copper-accelerated acetic acid-salt spray in accordance with ASTM B368-09.

22. A method of forming a glass article containing a glass substrate and a coating, the method comprising:
   applying a coating formulation comprising glass frit, a polymerizable polyol, a crosslinking agent comprising a melamine crosslinking agent, a second polymerizable compound, and a third polymerizable compound comprising at least two epoxide groups to a surface of the glass substrate,
   curing the coating formulation on the glass substrate.

* * * * *